(12) United States Patent
Hartsfield et al.

(10) Patent No.: US 12,434,957 B2
(45) Date of Patent: Oct. 7, 2025

(54) NITRO DISPENSING DEVICE

(71) Applicant: Gate CFV Solutions, Inc., Sebastian, FL (US)

(72) Inventors: Dustin Hartsfield, Sebastian, FL (US); Peter Brooke, Micco, FL (US); John Newton, Sebastian, FL (US); Michael Cheney, Vero Beach, FL (US); Gillian Callaghan, Vero Beach, FL (US)

(73) Assignee: GATES CFV Solutions, Inc., Sebastian, FL (US)

( * ) Notice: Subject to any disclaimer, the term of this patent is extended or adjusted under 35 U.S.C. 154(b) by 155 days.

(21) Appl. No.: 18/201,357

(22) Filed: May 24, 2023

(65) Prior Publication Data

US 2024/0391751 A1 Nov. 28, 2024

Related U.S. Application Data

(63) Continuation of application No. 16/716,899, filed on Dec. 17, 2019, now Pat. No. 11,673,785.

(60) Provisional application No. 62/783,559, filed on Dec. 21, 2018, provisional application No. 62/882,717, filed on Aug. 5, 2019.

(51) Int. Cl.
| | |
|---|---|
| *B67D 1/12* | (2006.01) |
| *A47J 31/46* | (2006.01) |
| *B67D 1/00* | (2006.01) |
| *B67D 1/08* | (2006.01) |

(52) U.S. Cl.
CPC .......... *B67D 1/0016* (2013.01); *A47J 31/467* (2013.01); *A47J 31/468* (2018.08); *B67D 1/0021* (2013.01); *B67D 1/0051* (2013.01); *B67D 1/0857* (2013.01); *B67D 1/1277* (2013.01)

(58) Field of Classification Search
CPC .. B67D 1/0016; B67D 1/0021; B67D 1/0051; B67D 1/0857; B67D 1/1277; B67D 2001/0093; B67D 2001/0481; B67D 1/1281; B67D 1/04; B67D 1/0443; B67D 1/0037; B67D 1/0039; B67D 1/1204; B67D 1/1279; B67D 1/0035; A47J 31/467; A47J 31/468
See application file for complete search history.

(56) References Cited

U.S. PATENT DOCUMENTS

| | | | | |
|---|---|---|---|---|
| 2,174,515 | A * | 10/1939 | Hughes | G05D 16/0655 431/89 |
| 4,830,511 | A * | 5/1989 | Smazik | B67D 1/1277 366/273 |
| 6,026,850 | A * | 2/2000 | Newton | G05D 16/0655 137/505.13 |
| 9,499,390 | B1 * | 11/2016 | Newton | B67D 1/0014 |
| 10,488,872 | B2 * | 11/2019 | Koinke | F16K 31/1221 |
| 10,785,996 | B2 * | 9/2020 | Giardino | B01F 25/313311 |
| 11,148,925 | B2 * | 10/2021 | Jeon | B67D 1/0072 |

(Continued)

*Primary Examiner* — Donnell A Long
(74) *Attorney, Agent, or Firm* — CF3; Stephen Eisenmann

(57) ABSTRACT

Examples disclosed herein relate to a dispensing device including a product unit with a pressure which transmits one or more products to an infuser, a water source with one or more CFValves that transmits water to the infuser, a gas source which transmits one or more gases to the infuser, and a dispensing area which dispenses a mixture generated via the infuser from a product unit input, a water source input, and a gas source input.

20 Claims, 17 Drawing Sheets

(56) References Cited

U.S. PATENT DOCUMENTS

| | | | |
|---|---|---|---|
| 2004/0144802 A1* | 7/2004 | Newton | B67D 1/0029 |
| | | | 222/145.5 |
| 2016/0106136 A1* | 4/2016 | Gordon | F28D 1/06 |
| | | | 426/477 |
| 2017/0297888 A1* | 10/2017 | Kleinrichert | B67D 1/004 |

* cited by examiner

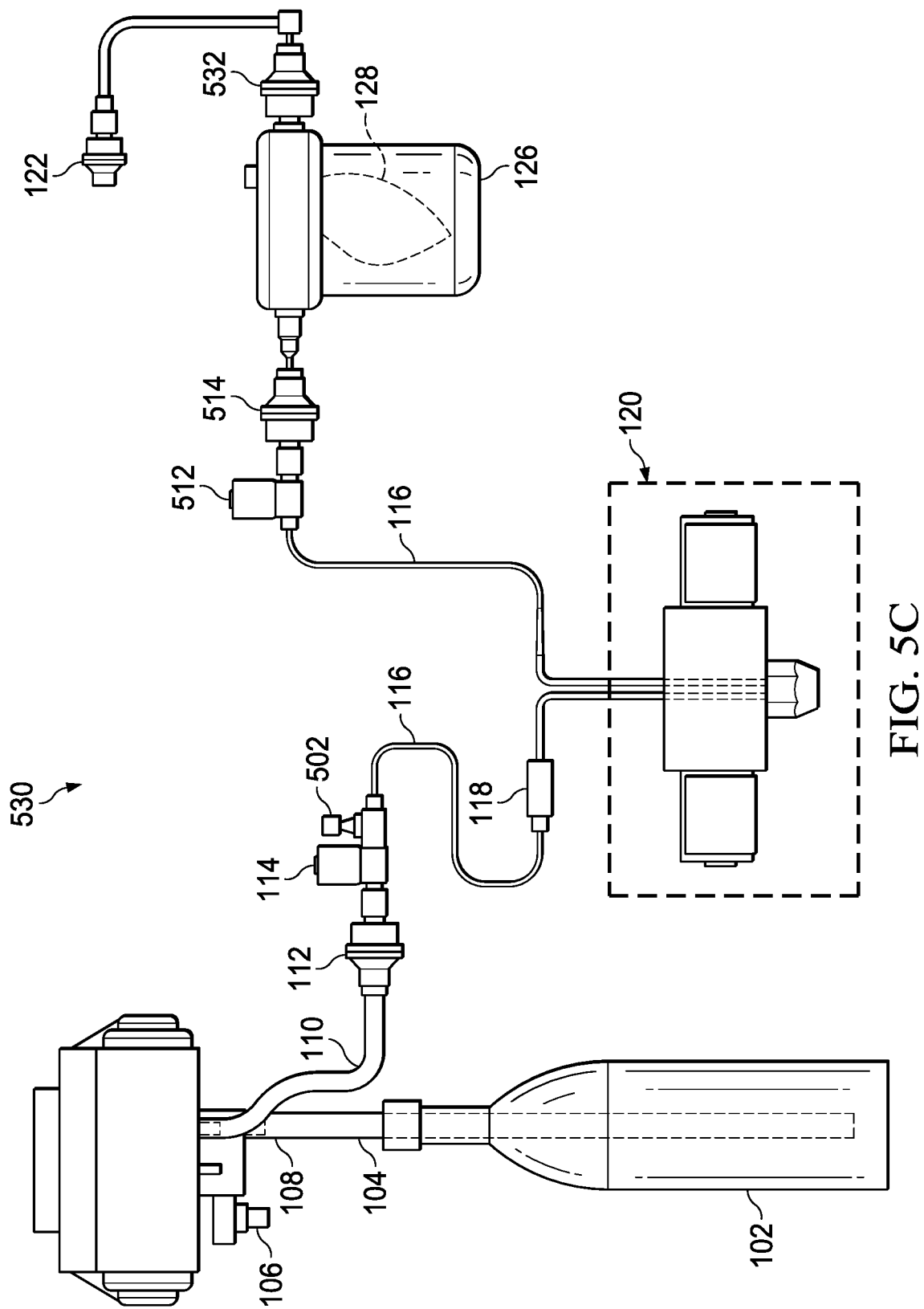

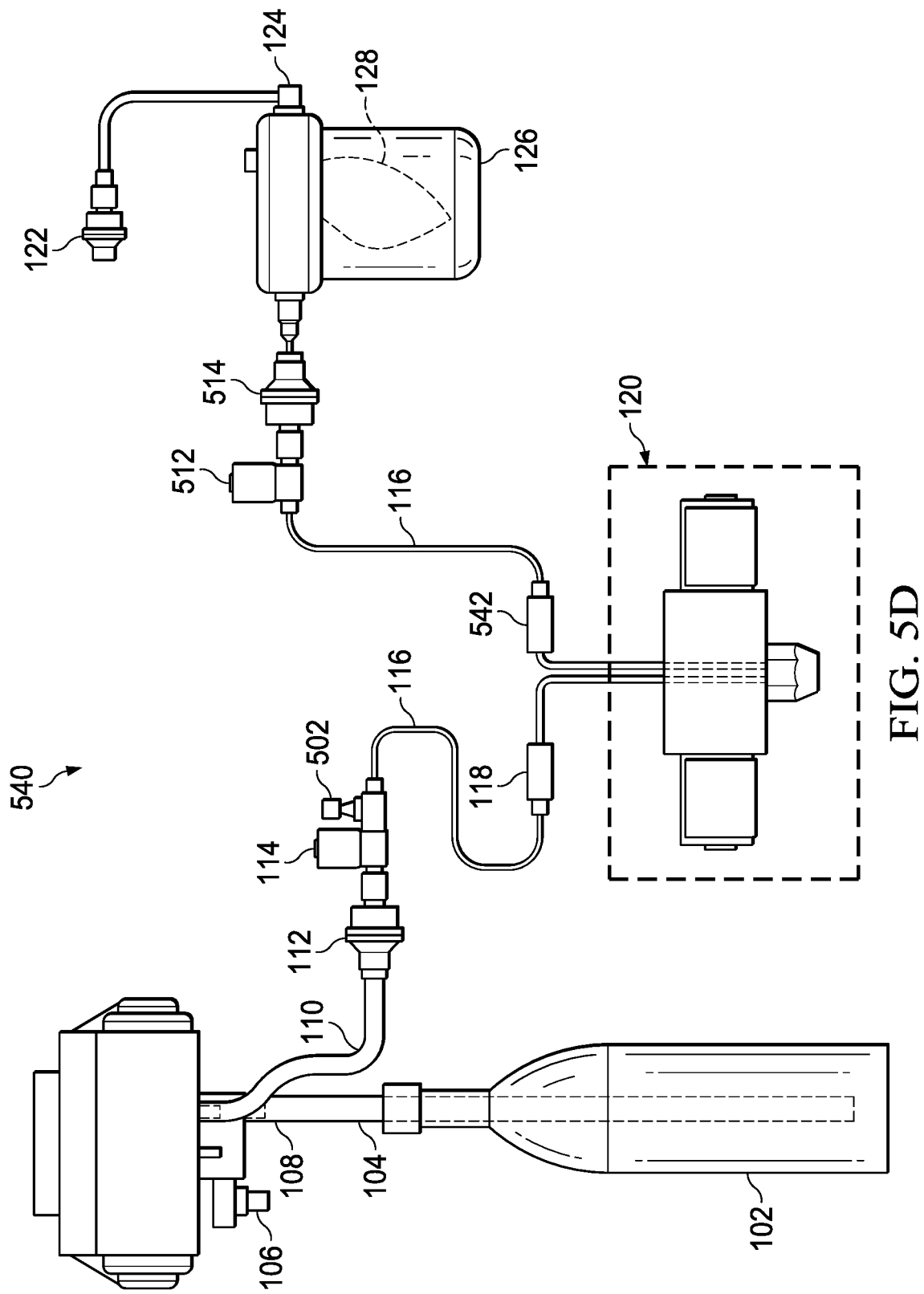

US 12,434,957 B2

NITRO DISPENSING DEVICE

REFERENCE

The present application claims priority to and is a continuation application of U.S. patent application Ser. No. 16/716,899, entitled "Nitro Dispensing Device", filed on Dec. 17, 2019, which claims priority to U.S. provisional patent application Ser. No. 62/783,559, entitled "Nitro Device", filed on Dec. 21, 2018 and U.S. provisional patent application Ser. No. 62/882,717, entitled "Nitro Device", filed on Aug. 5, 2019, which are incorporated in their entirety herein by reference.

FIELD

The subject matter disclosed herein relates to a dispensing unit. More specifically, to a cf valve functionality that allows for enhanced fluid control. Information:

The dispensing industry has numerous ways to dispense one or more fluids and/or gases. This disclosure highlights enhanced devices, methods, and systems for dispensing these one or more fluids and/or gases.

BRIEF DESCRIPTION OF THE FIGURES

Non-limiting and non-exhaustive examples will be described with reference to the following figures, wherein like reference numerals refer to like parts throughout the various figures.

FIG. 5C is another illustration of a dispensing system, according to one embodiment.

FIG. 5D is another illustration of a dispensing system, according to one embodiment.

DETAILED DESCRIPTION

Figure 1:
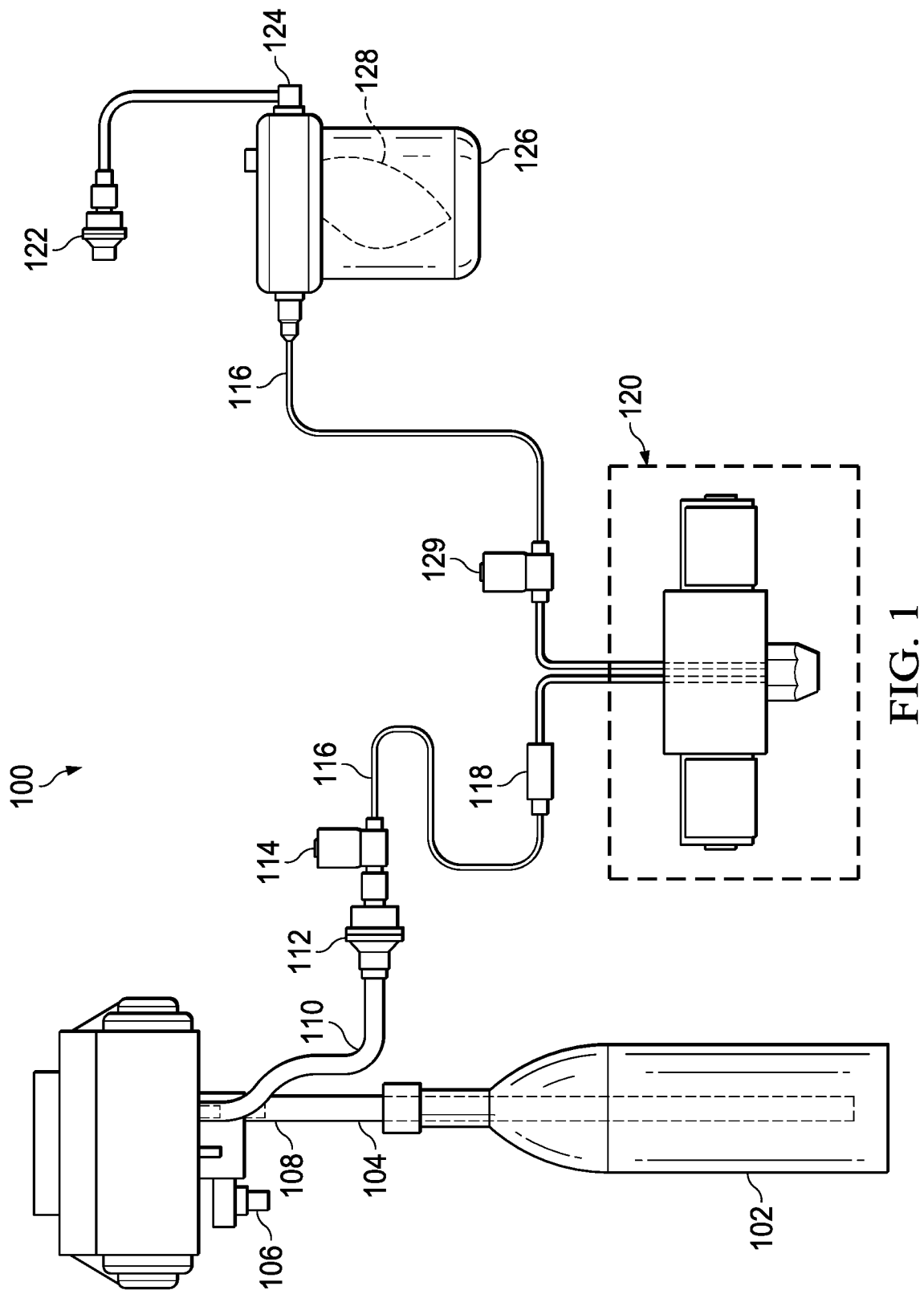
FIG. 1 is an illustration of a dispensing system, according to one embodiment.

In FIG. 1, a first dispensing system 100 is shown. The first dispensing system 100 includes a syrup source 102, a syrup input line 104, a syrup input area 108, a first CO2 input area 106, a second CO2 input area 122, a syrup out line 110, a CF Valve 112, a solenoid valve 114, a tube orifice 116, a check valve/adaptor 118, and a dispensing unit 120. Further, the first dispensing system 100 includes the second CO2 input area 122, a purge valve 124, a pressurized vessel 126 with a concentrate bag 128, another tube orifice 116, and a second solenoid value 129 (which feeds into the dispensing unit 120). In this example, solenoid valve 114 may be reduced in size and cost because the CF Valve 112 maintains a relatively constant pressure and/or flow rate. This is a major advancement as compared to existing systems (see FIG. 2A). A solenoid valve cost is related to the flow rate and/or pressure criteria the solenoid is designed to have as an input. In other words, a solenoid that has to be able to handle varying pressures from a first pressure (e.g., 20 PSI) to a second pressure (e.g., 60 PSI) has a first cost. Whereas, a second solenoid that has to be able to handle varying pressures from a third pressure (e.g., 13.8 PSI) to a fourth pressure (e.g., 14.2 PSI) has a second cost (see FIGS. 2A and 2B). In this example, the first cost is higher than the second cost because the pressure range is larger for the first solenoid versus the second solenoid. The syrup dispensing unit 107 (top left side of FIG. 1) which has the syrup input area 108, the first CO2 input area 106, and the syrup out line 110 coupled to the dispensing unit. The dispensing unit 107 may be electrical, mechanical, pneumatic operated and/or any combination thereof.

Figure 2A:
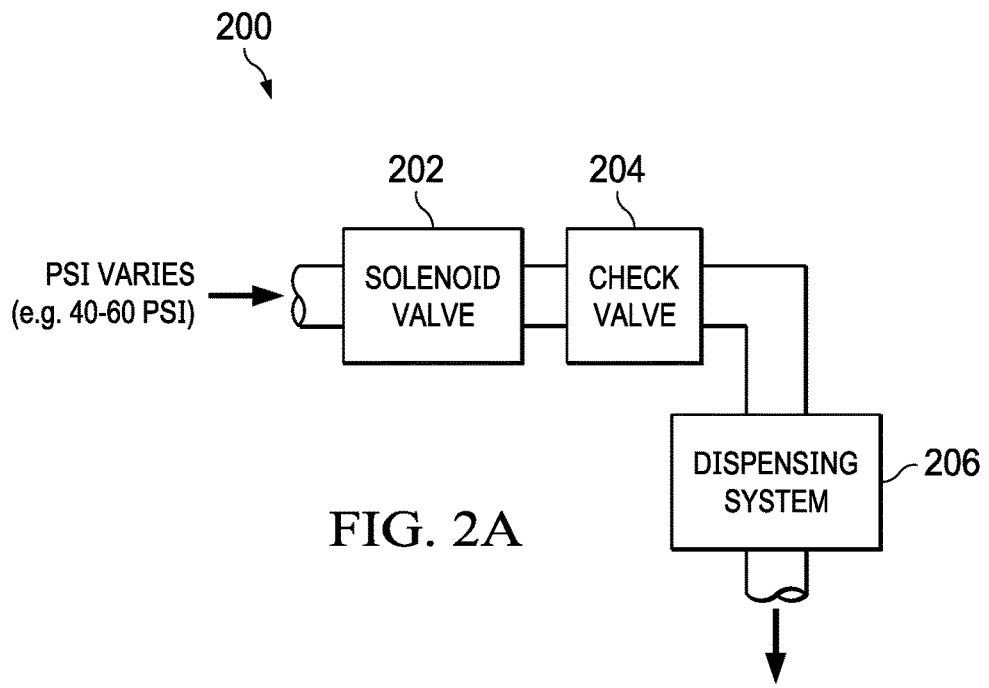
FIG. 2A is an illustration of a pressure device.
Figure 2B:
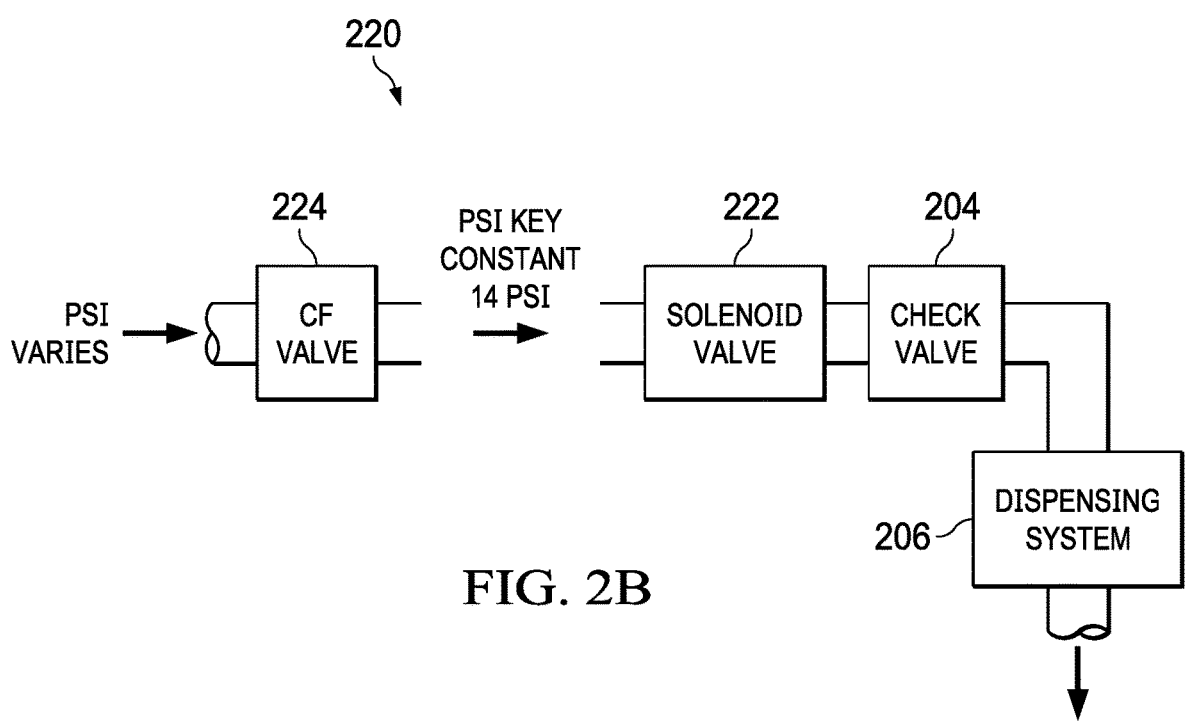
FIG. 2B is another illustration of a pressure device, according to one embodiment.

In the first example shown in FIG. 2A, a conventional system 200 is shown. A first solenoid valve 202 has an input source with varying pressures (e.g., PSI varies from 40 to 60 PSI) and the first solenoid has a first size and a first cost. The output from the first solenoid 202 goes through a tube orifice to a check valve 204 and then to a dispensing system 206. In the second example shown in FIG. 2B, a CF Valve system 220 includes a CF Valve 224 which has an input source with varying pressures and an output area with has a constant pressure and flow rate (e.g., 14 PSI) which enters a second solenoid valve 222 where the second solenoid valve 222 has a second size and a second cost. The output from the second solenoid 222 goes through a tube orifice to a check valve 204 and then to a dispensing system 206. In these examples, the second size and the second cost of the second solenoid valve 222 are far less than the first size and first cost of the first solenoid valve 202.

Figure 3:
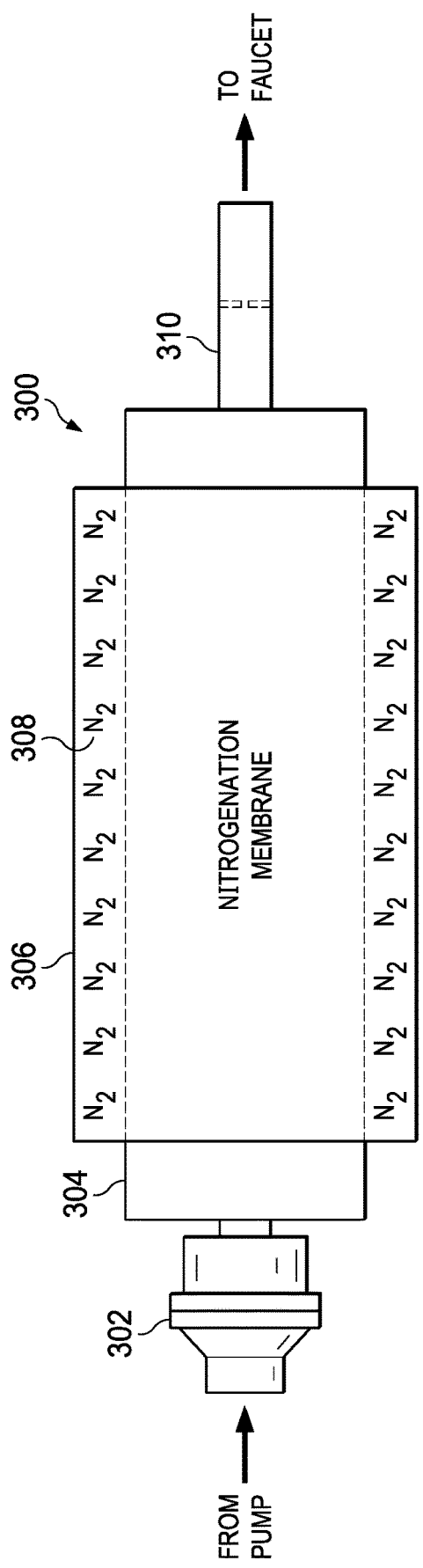
FIG. 3 is an illustration of a membrane device, according to one embodiment.

In FIG. 3, a membrane system 300 is shown. In one example, an input from a pump enters a CF Valve 302 which then exits the CF Valve 302 at a constant pressure and/or flow rate while entering a tube 304. The tube orifice 304 is surrounded by a membrane 306 which has one or more elements 308 (which in this example is N2). In this example, the N2 enters the fluid passing by the membrane 306 and exits the tube 304 at the exit area 310 towards the faucet.

Figure 4:
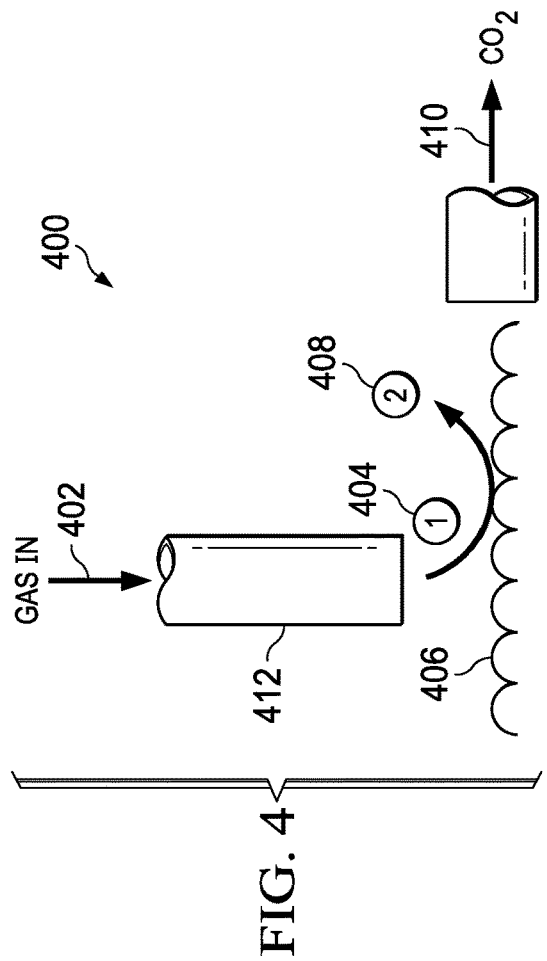
FIG. 4 is an illustration of a CO2 generating device, according to one embodiment.

In FIG. 4, a CO2 generator 400 is shown. In this example, a gas 402 is delivered via a tube 412 towards a generator 406. When the gas 402 goes from point one 404 and hits the generator 406 and moves to point two 408 a mixture 410 is created.

Figure 5A:
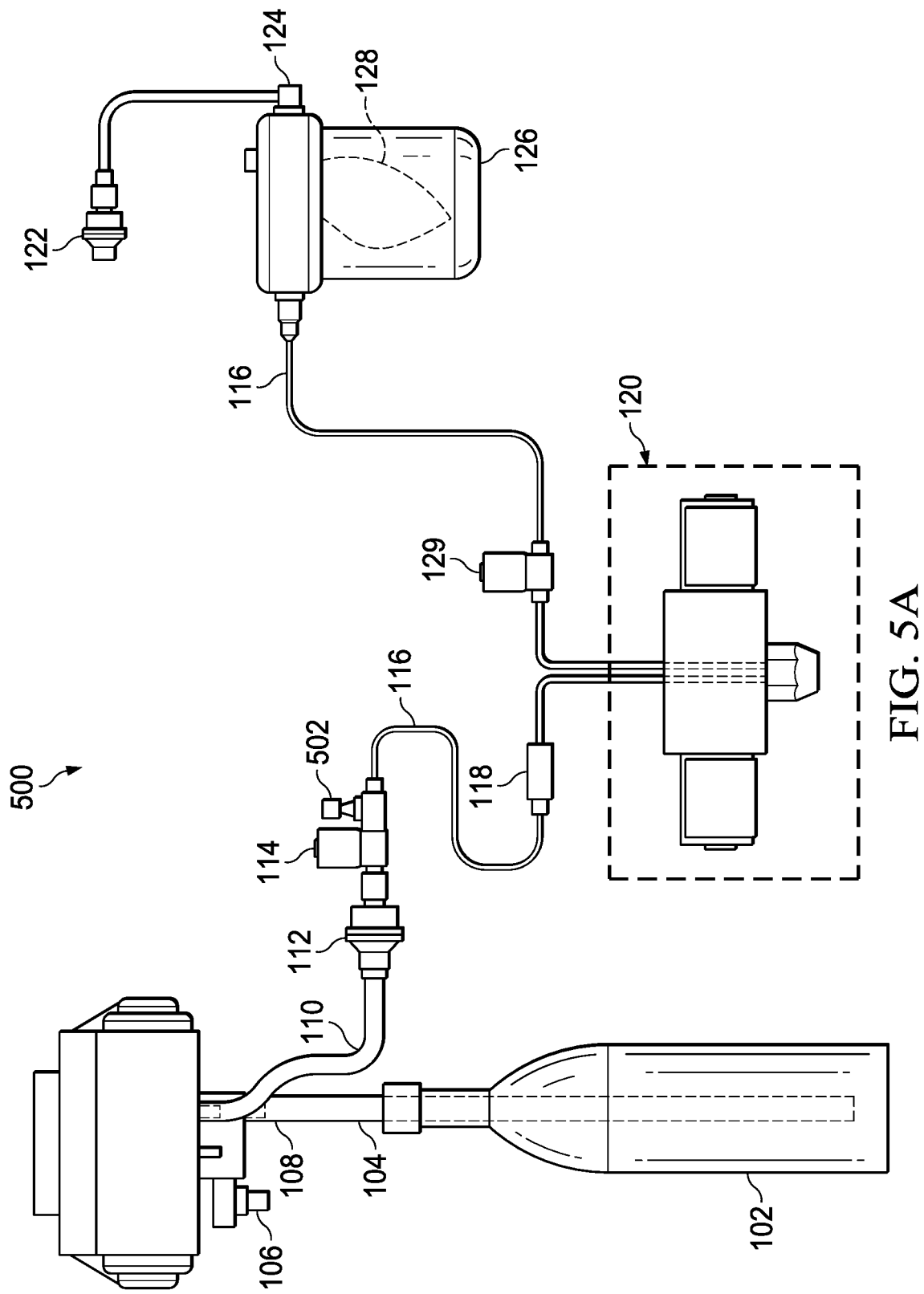
FIG. 5A is another illustration of a dispensing system, according to one embodiment.

In FIG. 5A, a second dispensing system 500 is shown. The second dispensing system 500 includes the syrup source 102, the syrup input line 104, the syrup input area 108, the first CO2 input area 106, the second CO2 input area 122, the syrup out line 110, the CF Valve 112, the solenoid valve 114, a needle valve 502, the tube orifice 116, the check valve/ adaptor 118, and the dispensing unit 120. Further, the second dispensing system 500 includes the second CO2 input area 122, the purge valve 124, the pressurized vessel 126 with the concentrate bag 128, another tube orifice 116, and the second solenoid value 129 (which feeds into the dispensing unit 120). In this example, the solenoid valve 114 may be reduced in size and cost because the CF Valve 112 maintains a relatively constant pressure and flow rate. This is a major advancement as compared to existing systems (see FIG. 2A). A solenoid valve cost is related to the flow rate and/or pressure criteria the solenoid is designed to have as an input. In other words, a solenoid that has to be able to handle varying pressures from a first pressure (e.g., 10 PSI) to a second pressure (e.g., 70 PSI) has a first cost. Whereas, a second solenoid that has to be able to handle varying pressures from a third pressure (e.g., 13.9 PSI) to a fourth pressure (e.g., 14.1 PSI) has a second cost (see FIGS. 2A and 2B). In this example, the first cost is higher than the second cost because the pressure range is larger for the first solenoid versus the second solenoid.

Figure 5B:
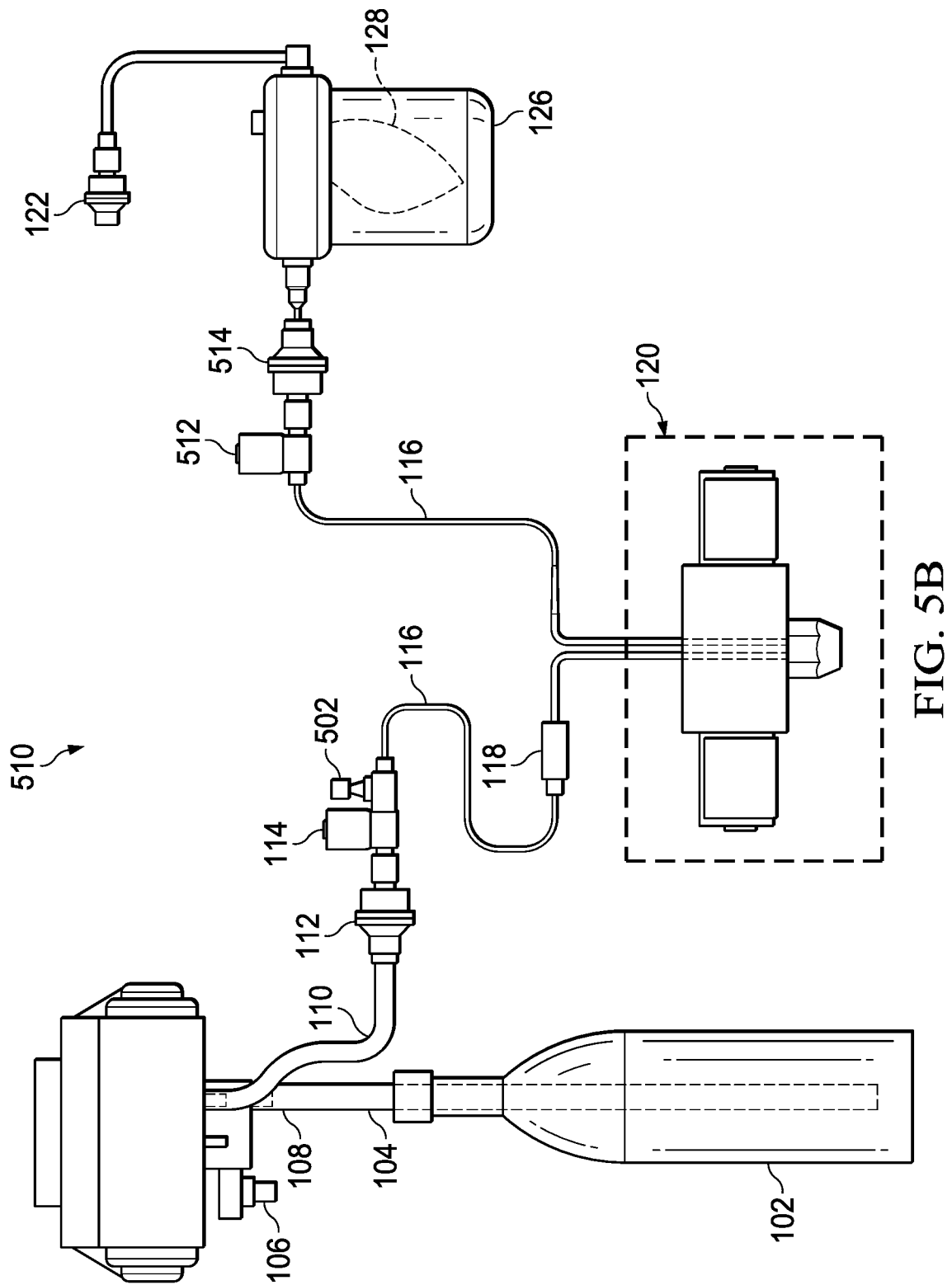
FIG. 5B is another illustration of a dispensing system, according to one embodiment.

In FIG. 5B, a third dispensing system 510 is shown. The third dispensing system 510 includes the syrup source 102, the syrup input line 104, the syrup input area 108, the first CO2 input area 106, the second CO2 input area 122, the syrup out line 110, the CF Valve 112, the solenoid valve 114, the needle valve 502, the tube orifice 116, the check valve/ adaptor 118, and the dispensing unit 120. Further, the third dispensing system 510 includes the second CO2 input area 122, the pressurized vessel 126 with the concentrate bag 128, a second CF Valve 514, a second solenoid valve 512, another tube orifice 116 which feeds into the dispensing unit 120). In this example, solenoid valve 114 and/or second solenoid valve 512 may be reduced in size and cost because the CF Valve 112 and/or the second CF Valve maintain a relatively constant pressure and flow rate. This is a major advancement as compared to existing systems (see FIG. 2A). A solenoid valve cost is related to the flow rate and/or pressure criteria the solenoid is designed to have as an input. In other words, a solenoid that has to be able to handle varying pressures from a first pressure (e.g., 25 PSI) to a second pressure (e.g., 50 PSI) has a first cost. Whereas, a second solenoid that has to be able to handle varying pressures from a third pressure (e.g., 13.7 PSI) to a fourth pressure (e.g., 14.3 PSI) has a second cost (see FIGS. 2A and 2B). In this example, the first cost is higher than the second cost because the pressure range is larger for the first solenoid versus the second solenoid.

In FIG. 5C, a fourth dispensing system 530 is shown. The fourth dispensing system 530 includes the syrup source 102, the syrup input line 104, the syrup input area 108, the first CO2 input area 106, the second CO2 input area 122, the syrup out line 110, the CF Valve 112, the solenoid valve 114, the needle valve 502, the tube orifice 116, the check valve/ adaptor 118, and the dispensing unit 120. Further, the fourth dispensing system 530 includes the second CO2 input area 122, a third CF Valve 532, the pressurized vessel 126 with the concentrate bag 128, the second CF Valve 514, the second solenoid valve 512, another tube orifice 116 which feeds into the dispensing unit 120). In this example, solenoid valve 114 and/or the second solenoid valve 512 may be reduced in size and cost because the CF Valve 112, the second CF Valve 514, and/or the third CF Valve 532 maintains a relatively constant pressure and flow rate. This is a major advancement as compared to existing systems (see FIG. 2A). A solenoid valve cost is related to the flow rate and/or pressure criteria the solenoid is designed to have as an input. In other words, a solenoid that has to be able to handle varying pressures from a first pressure (e.g., 30 PSI) to a second pressure (e.g., 50 PSI) has a first cost. Whereas, a second solenoid that has to be able to handle varying pressures from a third pressure (e.g., 13.6 PSI) to a fourth pressure (e.g., 14.4 PSI) has a second cost (see FIGS. 2A and 2B). In this example, the first cost is higher than the second cost because the pressure range is larger for the first solenoid versus the second solenoid.

In FIG. 5D, a fifth dispensing system 540 is shown. The fifth dispensing system 540 includes the syrup source 102, the syrup input line 104, the syrup input area 108, the first CO2 input area 106, the second CO2 input area 122, the syrup out line 110, the CF Valve 112, the solenoid valve 114, the needle valve 502, the tube orifice 116, the check valve/ adaptor 118, and the dispensing unit 120. Further, the fifth dispensing system 540 includes the second CO2 input area 122, the purge valve 124, the second CF Valve 514, the second solenoid 512, the pressurized vessel 126 with the concentrate bag 128, another tube orifice 116, and a second check valve/adaptor 542 (which feeds into the dispensing unit 120). In this example, solenoid valve 114 and/or second solenoid valve 512 may be reduced in size and cost because the CF Valve 112 and/or the second CF Valve maintain a relatively constant pressure and flow rate. This is a major advancement as compared to existing systems (see FIG. 2A). A solenoid valve cost is related to the flow rate and/or pressure criteria the solenoid is designed to have as an input. In other words, a solenoid that has to be able to handle varying pressures from a first pressure (e.g., 10 PSI) to a second pressure (e.g., 70 PSI) has a first cost. Whereas, a second solenoid that has to be able to handle varying pressures from a third pressure (e.g., 13.9 PSI) to a fourth pressure (e.g., 14.1 PSI) has a second cost (see FIGS. 2A and 2B). In this example, the first cost is higher than the second cost because the pressure range is larger for the first solenoid versus the second solenoid.

In FIGS. 5E-5J, the cf valves are shown. A fluid mixing and delivery system comprises a mixing chamber; a first supply line for supplying a first fluid component to the mixing chamber via a first CF Valve and a downstream first metering orifice; a second supply line for supplying a second fluid component to the mixing chamber via a second CF Valve and a downstream second metering orifice, with the first and second fluid components being combined in the mixing chamber to produce a fluid mixture; and a discharge line leading from the mixing chamber and through which the fluid mixture is delivered to a dispensing valve. This disclosure relates to a system for precisely metering and mixing fluids at variable mix ratios, and for delivering the resulting fluid mixtures at the same substantially constant flow rate for all selected mix ratios. The system is particularly useful for, although not limited in use to, the mixture of liquid beverage concentrates with a liquid diluent, and one specific example being the mixture of different tea concentrates with water.

Figure 5E:
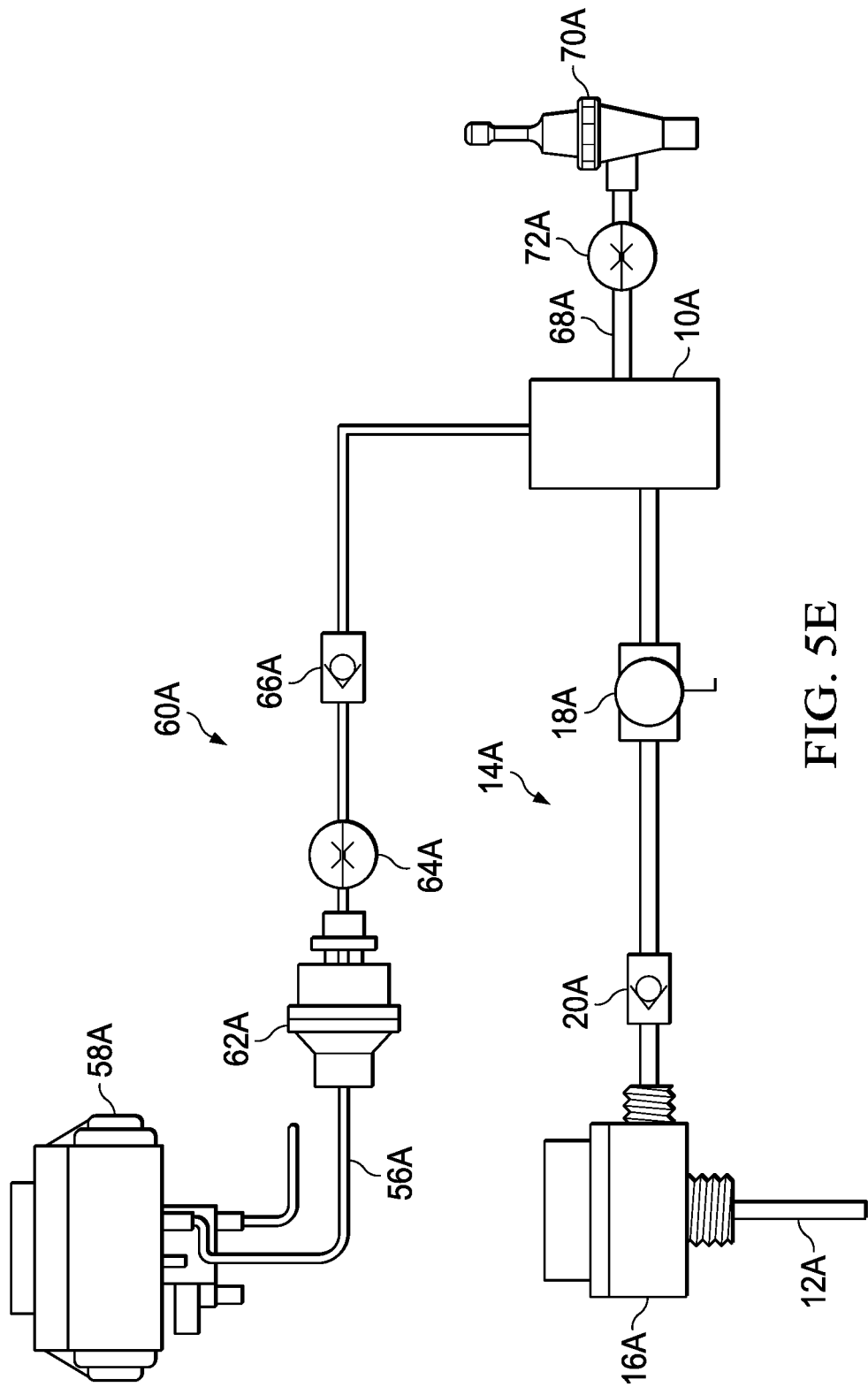
FIG. 5E is another illustration of a dispensing system, according to one embodiment.

With reference initially to FIG. 5E, one embodiment of a system in accordance with the present disclosure includes a mixing chamber 10A. A first fluid component, e.g., a water diluent is received via conduit 12A from a municipal water source and is supplied to the mixing chamber via a first supply line 14A. The first supply line includes a first constant flow valve 16A, a downstream needle valve providing a first metering orifice 18A, the size of which may be selectively varied, and an optional check valve 20A to prevent reverse fluid flow from the mixing chamber.

The constant flow valve (e.g., CF Valve) includes a housing made up of assembled exterior components 22A, 24A. The housing is internally subdivided by a barrier wall 26A into a head section 28A with an inlet 30A and base section subdivided by a modulating assembly 34A into a fluid chamber 36A segregated from a spring chamber 38A.

The modulating assembly 34A includes and is supported by a flexible diaphragm 40A, with a stem 42A that projects through a port 44A in the barrier wall 26A. Stem 42A terminates in enlarged head 46A with a tapered underside 48A surrounded by a tapered surface 50A of the barrier wall. A spring 52A urges the modulating assembly 34A towards the barrier wall 26A.

Figure 5F:
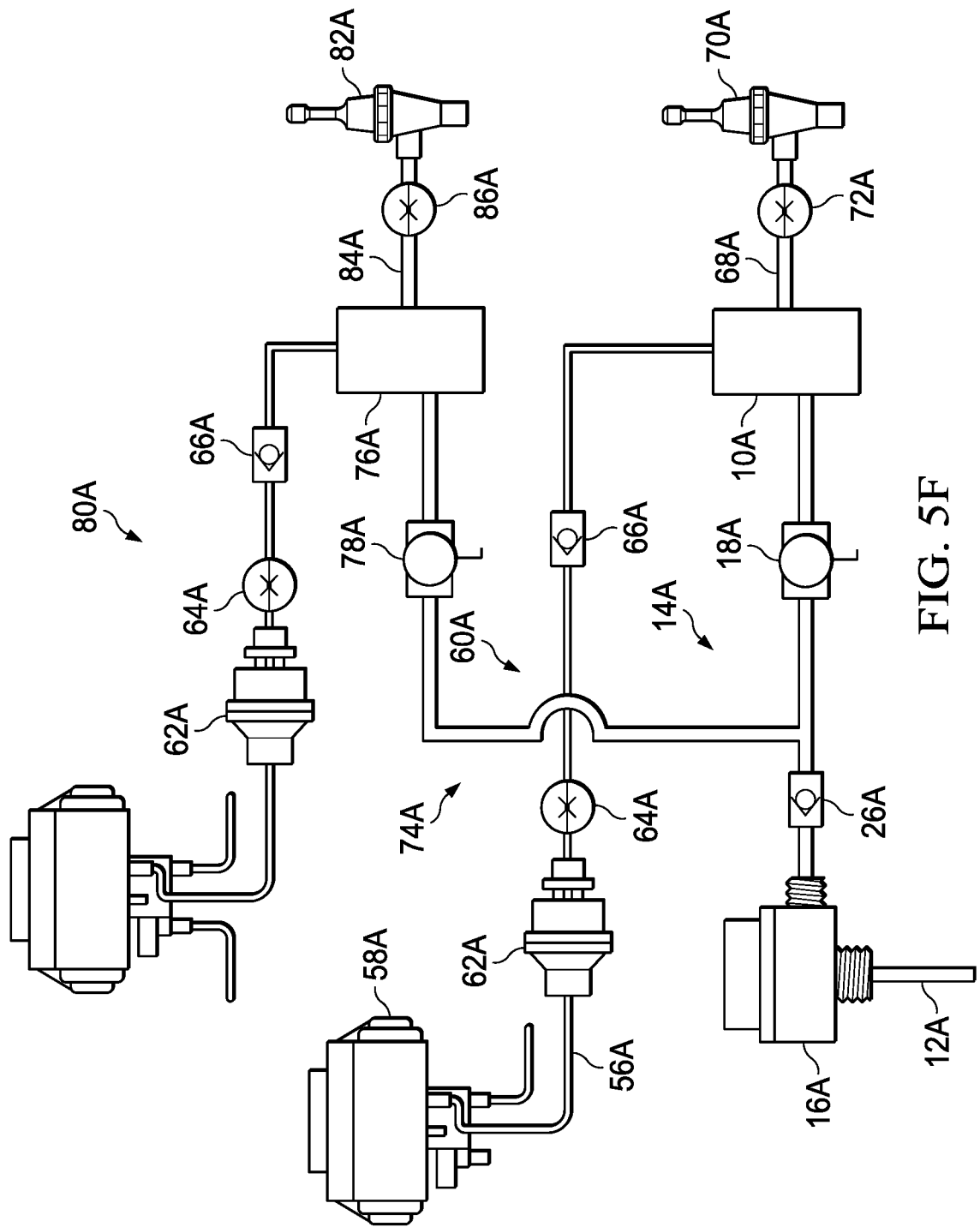
FIG. 5F is another illustration of a dispensing system, according to one embodiment.

The valve inlet 30A is adapted to be connected to conduit 12A, and a valve outlet 54A communicates with the fluid chamber 36A and is adapted to be connected to a remote system component, which in the system under consideration, is the mixing chamber 10A. The valve inlet 30A and outlet 54A respectively lie on axes A1, A2 that are arranged at 90° with respect to each other. Port 44A connects the valve head section 28A to the fluid chamber 36A. Inlet fluid pressures below a threshold level in the head section and fluid chamber are insufficient to overcome the closure force of spring 52A, resulting as depicted in FIG. 5H in the diaphragm being held in a closed position against a sealing ring on the barrier wall, thus preventing fluid flow through the fluid chamber 36A and out through the valve outlet 54A.

Figure 5G:
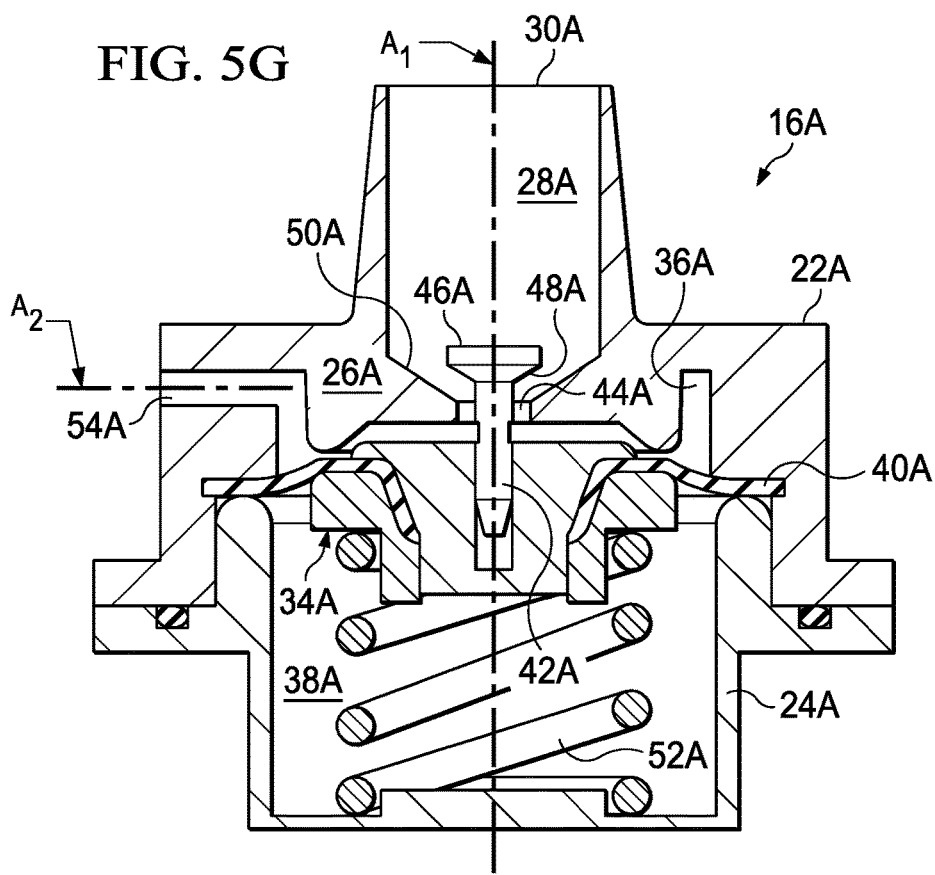
FIG. 5G is an illustration of a cf valve, according to one embodiment.
Figure 5H:
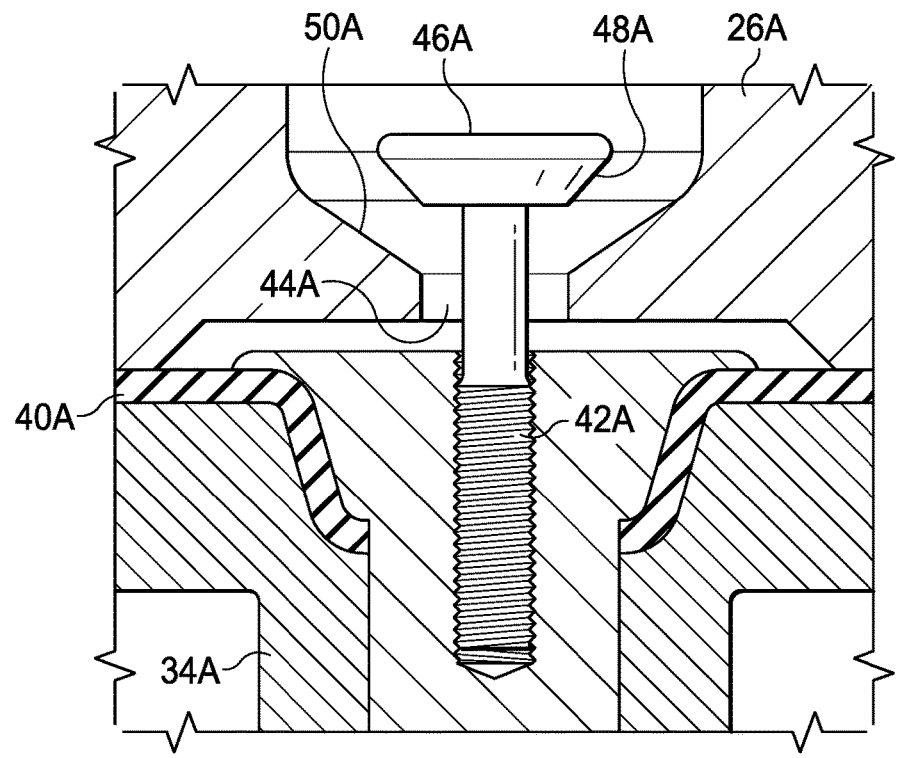
FIG. 5H is another illustration of a cf valve, according to one embodiment.
Figure 5I:
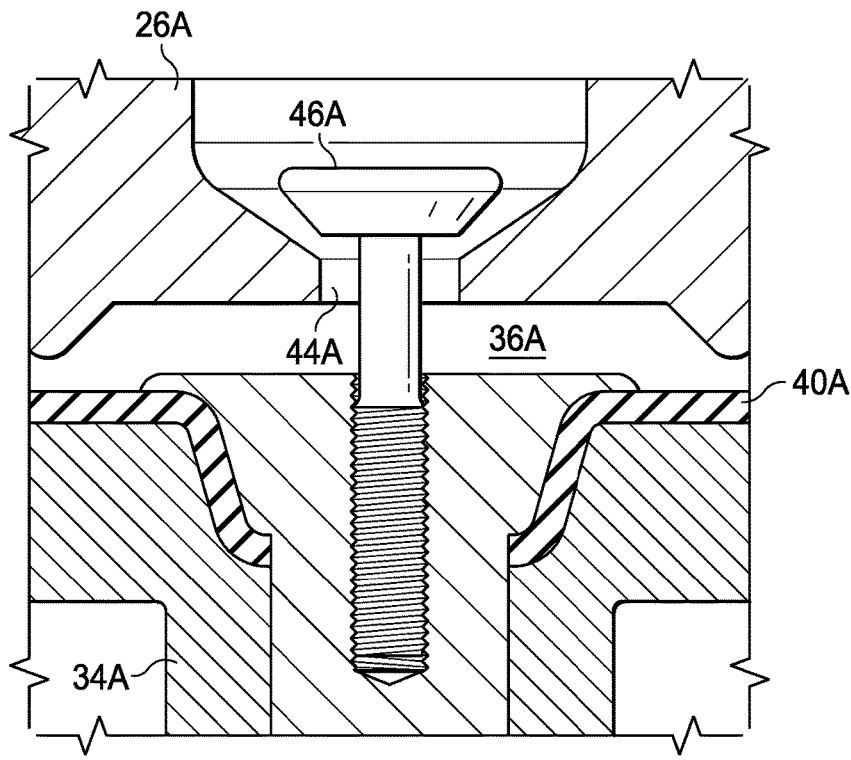
FIG. 5I is an illustration of a cf valve, according to one embodiment.

As shown in FIGS. 5G and 5I, at inlet pressures above the threshold level, the closure force of spring 52A is overcome, allowing the modulating assembly 34A and its diaphragm 40A to move away from the barrier wall 26A as operating pressure in the fluid chamber 36A increases. As fluid exits the fluid chamber, the downstream metering orifice 18A provides a flow restriction that creates a back pressure which adds to the inlet pressure to create a total operating pressure in the fluid chamber 36A.

If the inlet pressure decreases, the force of spring 52A will urge the modulating assembly 34A towards the barrier wall 26A, thus increasing the gap between the tapered surfaces 48A, 50A and increasing the flow of fluid into the fluid chamber 36A in order to maintain the operating pressure substantially constant.

A decrease in back pressure will have the same effect, causing the modulating assembly to move towards the barrier wall until flow through the port 44A is increases sufficiently to restore the operating pressure to its previous level.

Conversely, an increase in back pressure will increase the operating pressure in fluid chamber 36A, causing the modulating assembly to move away from the barrier wall, and reducing the gap between tapered surfaces 48A, 50A to lessen the flow of fluid into and through the fluid chamber 36A.

Figure 5J:
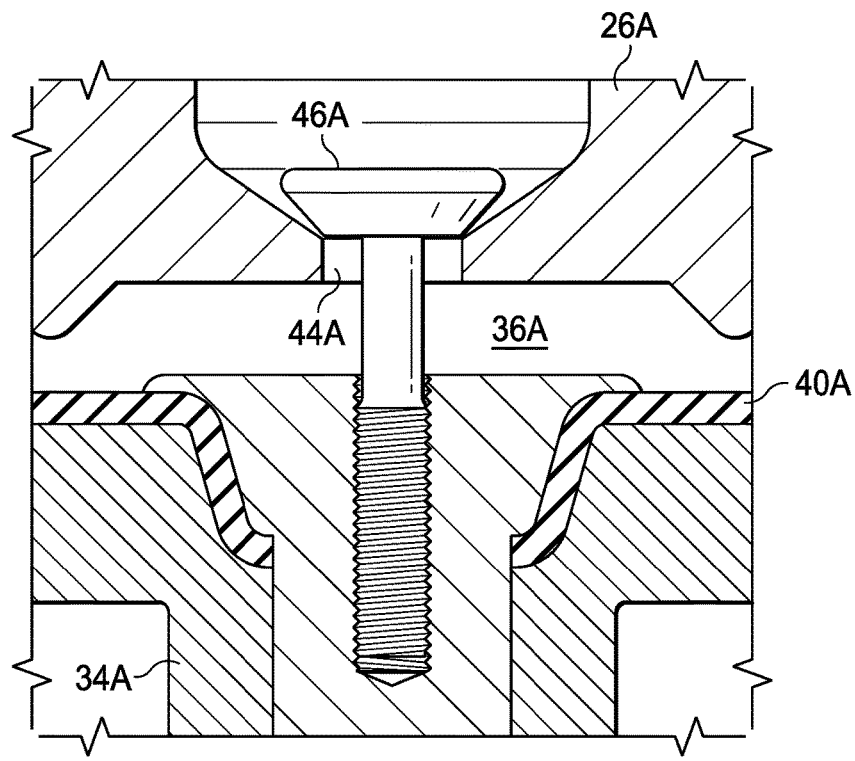
FIG. 5J is an illustration of a cf valve, according to one embodiment.

As shown in FIG. 5J, if the back pressure increases the operating pressure in fluid chamber 36 to a sufficiently high level, the modulating assembly will be moved away from the barrier wall to an extent sufficient to close the gap between tapered surfaces 48A, 50A, thus preventing any further flow through the valve.

Again with reference to FIG. 5E, a second fluid component, e.g., a liquid tea concentrate, is received via conduit 56A and is supplied to the mixing chamber 10A via a second supply line 60A. Conduit 56A is connected to a pressurized source of the second fluid component, one non limiting example being a pump 58A. The second supply line includes a second constant flow valve 62A, a downstream second metering orifice 64A having a fixed size, and another optional check valve 66A. The second constant flow valve may be of a "straight through" type where the valve inlets and outlets lie on the same axis. The first and second constant flow valves 16A, 22A serve to deliver the first and second fluid components to the mixing chamber 10A at substantially constant flow rates and pressures, irrespective of variations in the input pressures in the conduits 12A, 56A above the threshold levels of the valves.

The first and second fluid components are combined in the mixing chamber to produce a fluid mixture having a mix ratio governed by the selected variable size of the first metering orifice 18A and the fixed size of the second metering orifice 64A.

Although not shown, it will be understood that the locations of the first and second metering orifices 18A, 64A may be reversed, with the adjustable metering orifice 18A being located in the second supply line 60A and the fixed metering orifice being located in the first supply line 14A. Alternatively, both the first and second supply lines 14A, 60A may be equipped with adjustable orifices.

A discharge line 68A leads from the mixing chamber 10A and through which the fluid mixture is delivered to a dispensing valve 70A. A third metering orifice 72A is provided in the discharge line. As shown, the third metering orifice is upstream and separate from the dispensing valve. Alternatively, the third metering orifice may be included as an integral component of the dispensing valve.

When the dispensing valve is open, the discharge line 68A has a maximum flow rate that is lower than the combined minimum flow rates of the first and second constant flow valves 16A, 62A, thus creating a backpressure in the first and second supply lines 14A, 60A downstream of their respective constant flow valves. This back pressure adds to the inlet pressures applied to the constant flow valves to maintain the valves in the operating conditions shown in FIGS. 5G and 5I to thereby maintain a substantially constant pressure and flow rate of the first and second fluid components being delivered to the mixing chamber.

Any adjustment to the size of the first metering orifice 18A will result in a change in the flow rate of the first fluid component to the mixing chamber 10A. This in turn will change the backpressure in the mixing chamber and in the second supply line 60A downstream of the second constant flow valve 62A, causing an accompanying inverse change to the flow rate of the second fluid component being delivered through the second constant flow valve to the mixing chamber, and in turn causing a change in the mix ratio of the mixture exiting from the mixing chamber to the dispensing valve 70A. Although the mix ration is changed, the flow rate of the dispensed fluid mixture will remain substantially the same and substantially constant.

Closure of the dispensing valve 70A will produce elevated back pressures in the first and second supply lines 14A, 60A downstream of their respective constant flow valves 16A, 62A, causing the valves to assume the closed settings as shown in FIG. 5J.

In the system embodiment illustrated in FIG. 5F, a third supply line 74A leads from the first supply line 14A to a second mixing chamber 76A. The third supply line 74A includes another adjustable metering orifice 78A. The second mixing chamber 76A is supplied with another fluid component, e.g., a different tea concentrate, via a fourth supply line 80A having the same components as the second supply line 60A. The fluid mixture exits from mixing chamber 76A to another dispensing valve 82A via a discharge line 84A having a metering orifice 86A.

The dispensing valves 70A, 82A may be selectively opened and closed, with constant flow valve 16A acting in concert with the constant flow valves 62A of either or both supply lines 60A, 74A to maintain the selected mix ratios exiting from one or both mixing chambers 10A, 76A at the same substantially constant volumes.

In one embodiment, a dispensing device includes a syrup unit configured to transmit via one or more orifices one or more syrups and water to a dispensing block, a syrup source coupled to the syrup unit configured to provide the one or more syrups to the syrup unit, a water source configured to provide the water to the syrup unit, and a cf valve coupled to a first orifice upstream of a solenoid valve where the cf valve is configured to provide a first range of pressures to the solenoid valve and where the first orifice is coupled to the dispensing block.

In another example, the dispensing device may further include a check valve adaptor coupled to the first orifice downstream of the solenoid valve. Further, the water may be any fluid including carbonated water. In addition, the dispensing device may include a needle valve coupled to the first orifice downstream of the solenoid valve. In another example, the configuration of the solenoid valve may change based on the cf valve providing the first range of pressures to the solenoid valve. The change in configuration of the solenoid valve may reduce a size and/or cost of the solenoid valve. In another example, the first orifice may be either fixed or adjustable and/or a combination of both when there are more than one orifice.

In another example, the cf valve is a regulating valve for maintaining a substantially constant flow of fluid from a variable pressure fluid supply to a fluid outlet, the cf valve may include: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

In another example, at least one of the one or more syrups is configured to be selectable. In another embodiment, a dispensing device may include: a syrup unit configured to transmit via one or more orifices at least one or more syrups, one or more gases, and water to a dispensing block; a syrup source coupled to the syrup unit configured to provide the one or more syrups to the syrup unit; a water source configured to provide the water to at least one of the syrup unit and the dispensing block; and a cf valve coupled to a first orifice upstream of a solenoid valve, wherein the cf valve is configured to provide a first range of pressures to the solenoid valve where the first orifice is coupled to the dispensing block.

In another embodiment, a dispensing system may include: a first dispensing unit which includes: a first syrup unit which transmits via a first group of orifices a first group of syrups and water to a dispensing block; a first syrup source coupled to the syrup unit which provides the first group of syrups to the first syrup unit; a first water source which provides the water to the first syrup unit; and a first cf valve coupled to a first orifice upstream of a first solenoid valve, where the first cf valve is provides a first range of pressures to the first solenoid valve; and a second dispensing unit which includes: a second syrup unit which transmits via a second group of orifices a second group of syrups and water to the dispensing block; a second syrup source coupled to the second syrup unit via a concentrate bag which provides the second group of syrups to the second syrup unit; and a second solenoid valve coupled to a second orifice where the second orifice is coupled to the dispensing block.

The dispensing system may further include a check valve adaptor coupled to the first orifice downstream of the first solenoid valve. In addition, at least one of the water sources may be carbonated water. Further, the dispensing system may include a needle valve coupled to the first orifice downstream of the first solenoid valve. In another example, the dispensing system may include a second cf valve coupled to the second orifice upstream of the second solenoid valve. In another example, the dispensing system may include a third cf valve coupled a third orifice upstream of the second syrup unit. In addition, the dispensing system may include a second cf valve coupled to a third orifice upstream of the second syrup unit. In another example, the dispensing system may include a check valve coupled to the second orifice downstream of the second solenoid valve.

Further, the first cf valve is a regulating valve for maintaining a substantially constant flow of fluid from a variable pressure fluid supply to a fluid outlet, the first cf valve may include: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

In another embodiment, a dispensing system may include: a first dispensing unit including: a first syrup unit which transmits via a first group of orifices at least one of a first group of syrups, a first group of gases, and water to a dispensing block; a first syrup source coupled to the syrup unit which provides the first group of syrups to the first syrup unit; a first water source which provides the water to at least one of the first syrup unit and the dispensing block; and/or a first cf valve coupled to a first orifice upstream of a first solenoid valve where the first cf valve is provides a first range of pressures to the first solenoid valve. The dispensing system may further include: a second dispensing unit including: a second syrup unit which transmits via a second group of orifices at least one of a second group of syrups, a second group of gases, and water to the dispensing block; a second syrup source coupled to the second syrup unit via a concentrate bag which provides the second group of syrups to the second syrup unit; a second water source which provides the water to at least one of the second syrup unit and the dispensing block; and a second solenoid valve coupled to a second orifice where the second orifice is coupled to the dispensing block.

In another embodiment, a pressure device includes: a cf valve coupled upstream to a solenoid valve; and a check valve coupled downstream of the solenoid valve where the cf valve provides a range of pressures to the solenoid valve.

In another example, the range of pressures is smaller than a second range of pressures the solenoid valve would encounter in the absences of the cf valve.

Figure 5K:
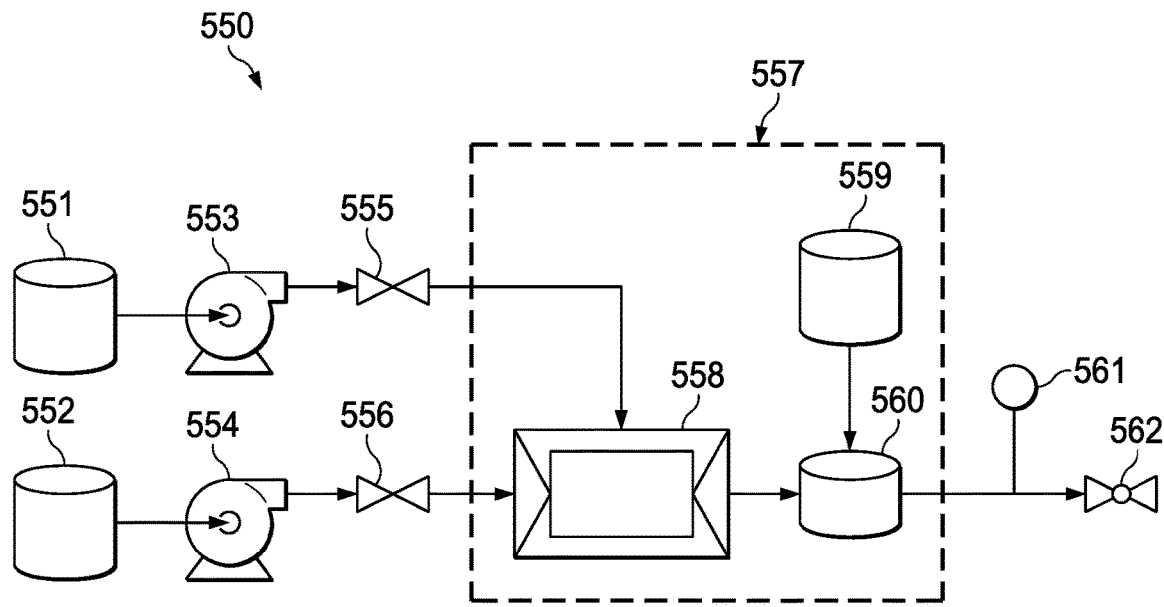
FIG. 5K is an illustration of a dispensing system, according to one embodiment.

In FIG. 5K, an illustration of a dispensing system is shown, according to one embodiment. A first dispensing system 550 may include a water source 551 (and/or any other liquid source-carbonated water, mixed liquids, etc.), a first pump 553, a first CFValve 555, a mixing chamber 558, an infuser 560, a first gas source 559, a transducer 561, and/or a dispensing valve 562 (e.g., a nitro dispensing valve). In addition, the first dispensing system 550 may include a container of concentrate 552 (e.g., a bag-in-box device, a KEG, etc.), a second pump 554 (e.g., a volumetric pump, brix pump, etc.), and a second CFValve 556. In addition, the mixing chamber 558, the infuser 560, and/or the first gas source 559 may be a single unit 557. In another example, either the first CFValve 555 or the second CFValve 556 may not be utilized. For example, if there is sufficient water pressure, the water pump (reference number 553) would not be needed. In addition, the bag-in-box device 552 (or container of concentrate, or KEG, etc.) may be any syrup dispensing source, element, and/or device. In another example, water is introduced at a constant volume via the booster pump and a constant pressure via the first CFValve 555. Further, the syrup is volumetrically portioned at a constant ratio. In one example, the second pump 554 could be speed controlled to allow for calibration on a per unit basis. In one example, when a speed controlled volumetric pump is used there may not be a need for a CFValve downstream on the syrup side. In one example, the mixing chamber 558 may be a John Guest Y fitting. In another example, the infuser 560 may be a sparger. In another example, the pressure transducer 561 could control the activation of one or more of the pumps based on pressure drop (e.g., valve open=on, valve closed=off). In another example, water is introduced at a constant pressure via the booster pump and/or the brixing pump handles all beverage mixings. The CFValve (555 or 556) is then used to ensure constant pressure to the infuser 560. The mixing chamber 558, the infuser 560, and/or the pressure transducer 561 may function similarly to previously disclosed options. In one example, when a traditional bag-in-box pump is used a CFValve may be utilized to maintain portion control because in-line orifice plates may result in pressure drops. There are many advantages of these embodiments and/or example. For example, the system creates a fixed pressure for the water and syrup mixture that then allows the correct amount of gas to be added for proper carbonation or nitrogenization, etc. In addition, when the volumetric speed controlling pump is utilized, the ratio of coffee/concentrate/product to water can be adjusted without upsetting the fixed pressure and/or the proper infusion of gas. For example, fixed pressure of nitrogen (e.g., gas) and volume of water and syrup be determined and utilized. In addition, the CFValve does not allow full line pressure to bleed through to cause a casual pour which is known in the art as a pour with two much or too little gas being in the first dispensed product after the unit is idle. There is no over or under infusing of gas because the CFValve does not allow pressure to go through to the other side where the product is located.

Figure 5L:
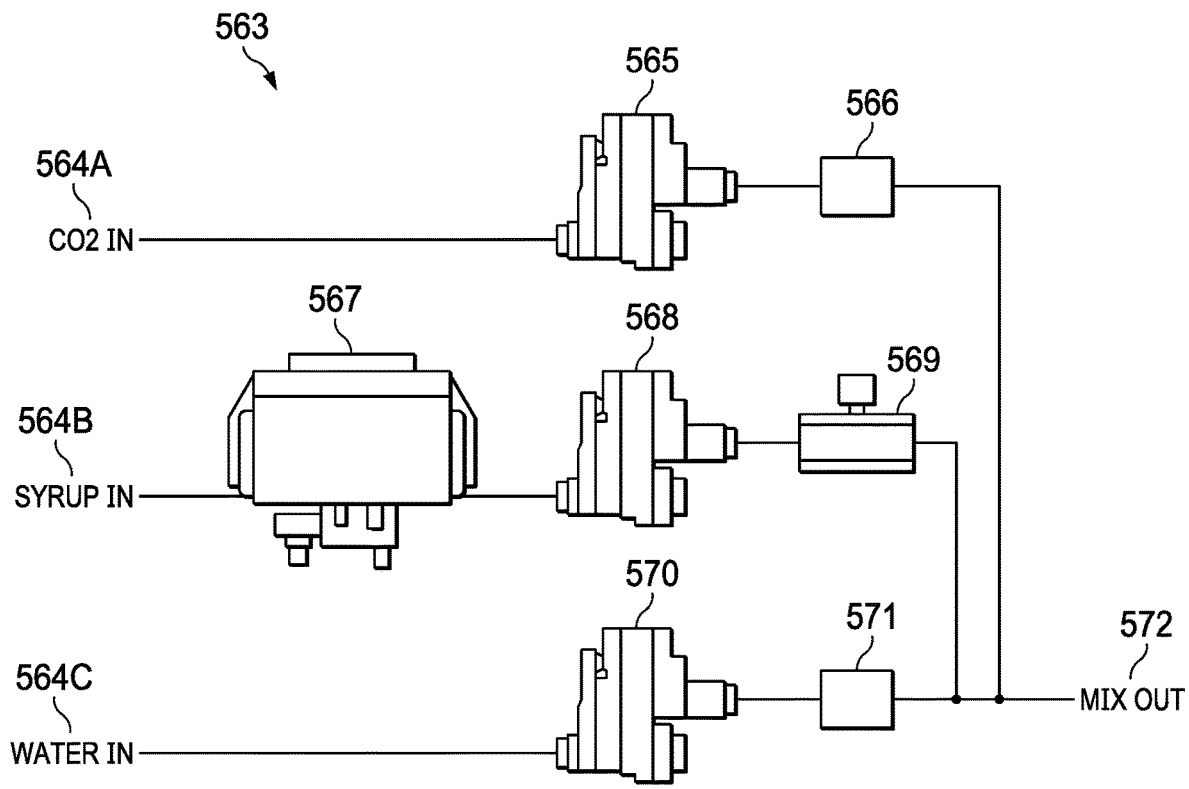
FIG. 5L is another illustration of a dispensing system, according to one embodiment.

In FIG. 5L, another illustration of a dispensing system is shown, according to one embodiment. A second dispensing system 563 may include a first gas source 564A (e.g., Nitrogen, CO2, compressed air, mixed gas, etc.), a first syrup source 564B, and a first water source 564C. One or more gases from the first gas source 564A may enter a first CFValve 565 (which produces a first pressure-43 PSI) and travels through a first orifice 566 to be part of a mix 572. In addition, one or more syrups from the first syrup source 564B may enter a pneumatic and/or BIB pump 567 and a second CFValve 568 (which produces a second pressure-43 PSI) and travels through a needle valve 569 to be part of the mix 572. Further, water from the first water source 564C may enter a third CFValve 570 (which produces an Nth pressure—29 PSI) and travels through a second orifice 571 to be part of the mix 572. In one embodiment, the solenoids on the CFValves (reference numbers 565, 568, and/or 570) can be combined with a fixed orifice and the solenoids can be controlled by a program to pulse or modify on-time for each type of drink to change the ratio of the syrup, water, and/or gas to be mixed. For example, a dispensing system could have Nth drinking options (e.g., Nitro orange juice, Carbonated orange juice, a cola product, a diet cola product, a coffee product, a nitro coffee product, a water product, a juice product with no gas in it, etc.). In one example, the water functions (e.g., pressure, flow rate, etc.) are kept constant (e.g., predetermined settings) and the gas functions (e.g., pressure, flow rate, etc.) are kept constant (e.g. predetermined settings) while the syrup pressure and/or flow rate is varied to obtain the desired product. For example, the syrup may be allowed to flow for 1 minute, 2 minutes, etc. or the syrup may be pulsed for a predetermined amount of pulses or time period. In another example, the water functions (e.g., pressure, flow rate, etc.) are kept constant (e.g., predetermined settings) and the syrup functions (e.g., pressure, flow rate, etc.) are kept constant (e.g. predetermined settings) while the gas pressure and/or flow rate is varied to obtain the desired product. For example, the gas may be allowed to flow for 1 minute, 2 minutes, etc. or the gas may be pulsed for a predetermined amount of pulses or time period. In another example, the syrup functions (e.g., pressure, flow rate, etc.) are kept constant (e.g., predetermined settings) and the gas functions (e.g., pressure, flow rate, etc.) are kept constant (e.g. predetermined settings) while the water pressure and/or flow rate is varied to obtain the desired product. For example, the water may be allowed to flow for 1 minute, 2 minutes, etc. or the water may be pulsed for a predetermined amount of pulses or time period. In various examples, two of these functions (e.g., water, syrup, and/or gas) can be kept constant while the third function (e.g., water, syrup, or gas) varies. Alternatively, one function (e.g., water, syrup, or gas) can be kept constant while the other two functions (e.g., water, syrup, and/or gas) vary. In one embodiment, the orifices (reference numbers 566, 569, and/or 571) may be fixed or variable or a combination of fixed and variable orifices. In another example, the CFV 565 may not be utilized for controlling the gas pressure. Some of the advantages of this system are that there can be a perfect mix of gas, syrup, and/or water into a pressure canister or to atmosphere while providing for a fixed ratio or the ability to change ratio either manually through the needle valve or electrically via the pulsing/timing program of the solenoid on the CFValve. This system drastically reduces service time and/or required service of existing drink equipment as ratios can be fixed and not require adjustments or programmed in to not require any modifications if syrup or gas mix is changed. The system also provides the benefit of substantially reducing the mechanical failure in the current ceramic based systems.

Figure 5M:
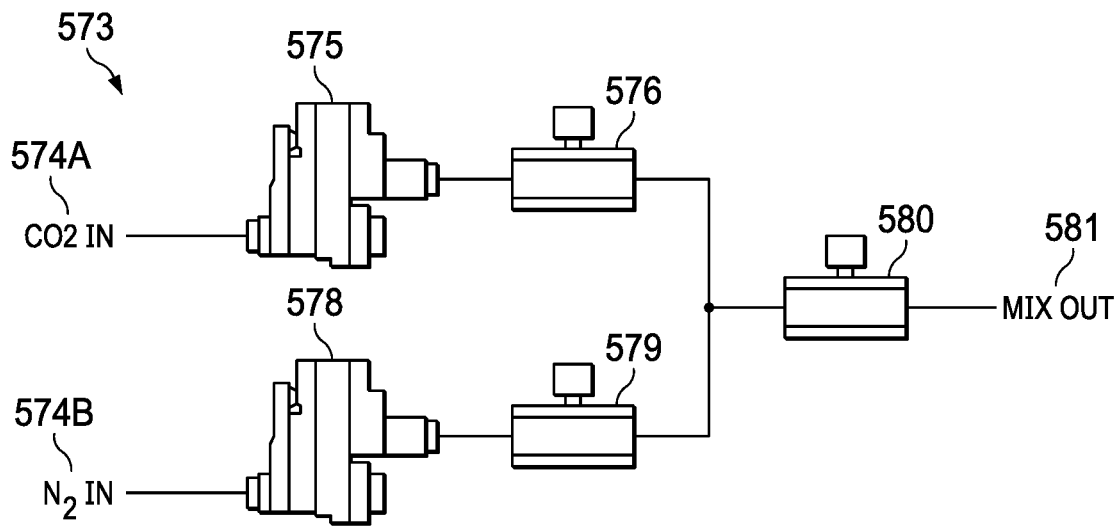
FIG. 5M is another illustration of a dispensing system, according to one embodiment.

In FIG. 5M, another illustration of a dispensing system is shown, according to one embodiment. A third dispensing system 573 may include a first gas source 574A and a second gas source 574B (and/or Nth gas source). In one example, the first gas source 574A may enter a first CFValve 575 and exit the first CFValve 575 to enter a first ratio adjustment valve 576 to be received at a total flow adjustment valve 580 to be part of a mix 581. In addition, the second gas source 574B (and/or Nth gas source) may enter a second CFValve 578 and exit the second CFValve 578 to enter a second ratio adjustment valve 579 to be received at the total flow adjustment valve 580 to be part of the mix 581. In another embodiment, the orifices (reference numbers 576 and/or 579) can be fixed or only one can be variable to manage the mixture between gases. In another example, the orifices (reference numbers 576 and/or 579) can be fixed but the first CFValve 575 and/or the second CFValve 578 can be pulsed or timed to create pre-programmed mixes of gases. Some of the advantages of this system are that it allows for accurate mixing of various gases into a beverage dispensing device to allow custom drinks to include one or more gases at various ratios. In addition, the system provides a cost effective and fixed method to mix gases either mechanically with a fixed or adjustable orifice or electronically with a programmed pulse or timed control of one or more CFValves. In addition, the system can be utilized with multiple drink options and multiple gas options to have a single drink dispenser which is able to dispense all types of drink (e.g., a first gas drink (e.g., Nitrogen), a second gas drink (e.g., Carbonated), an Nth gas drink, a first non-gas drink (e.g., juice), etc.).

Figure 6:
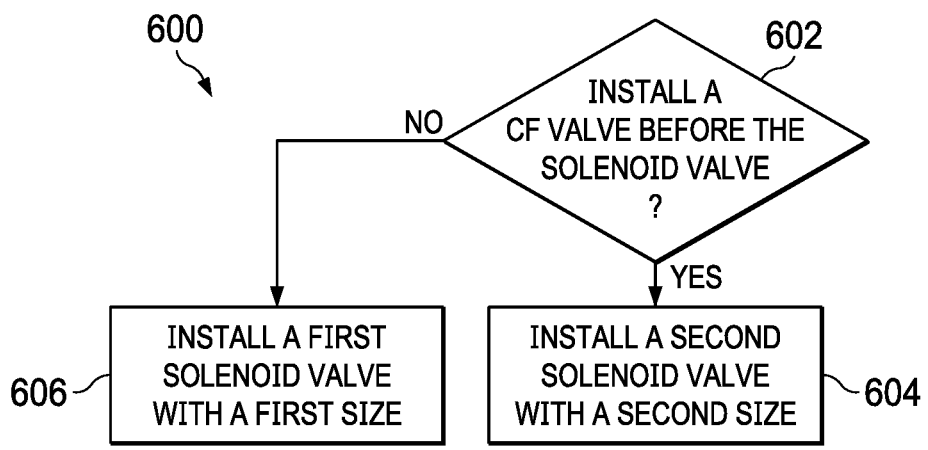
FIG. 6 is a flow chart, according to one embodiment.

In FIG. 6, a flow chart is shown, according to one embodiment. A method 600 may include a determining of whether to install a CFValve before the solenoid valve (step 602). If a CFValve should be installed, then the method 600 installs a second solenoid valve with a second size (step 604). If a CFValve should not be installed, then the method 600 installs a first solenoid valve with a first size (step 602). In this example, the second size is smaller than the first size because the installation of a CFValve allows for the solenoid size to be reduced and/or minimized.

Figure 7:
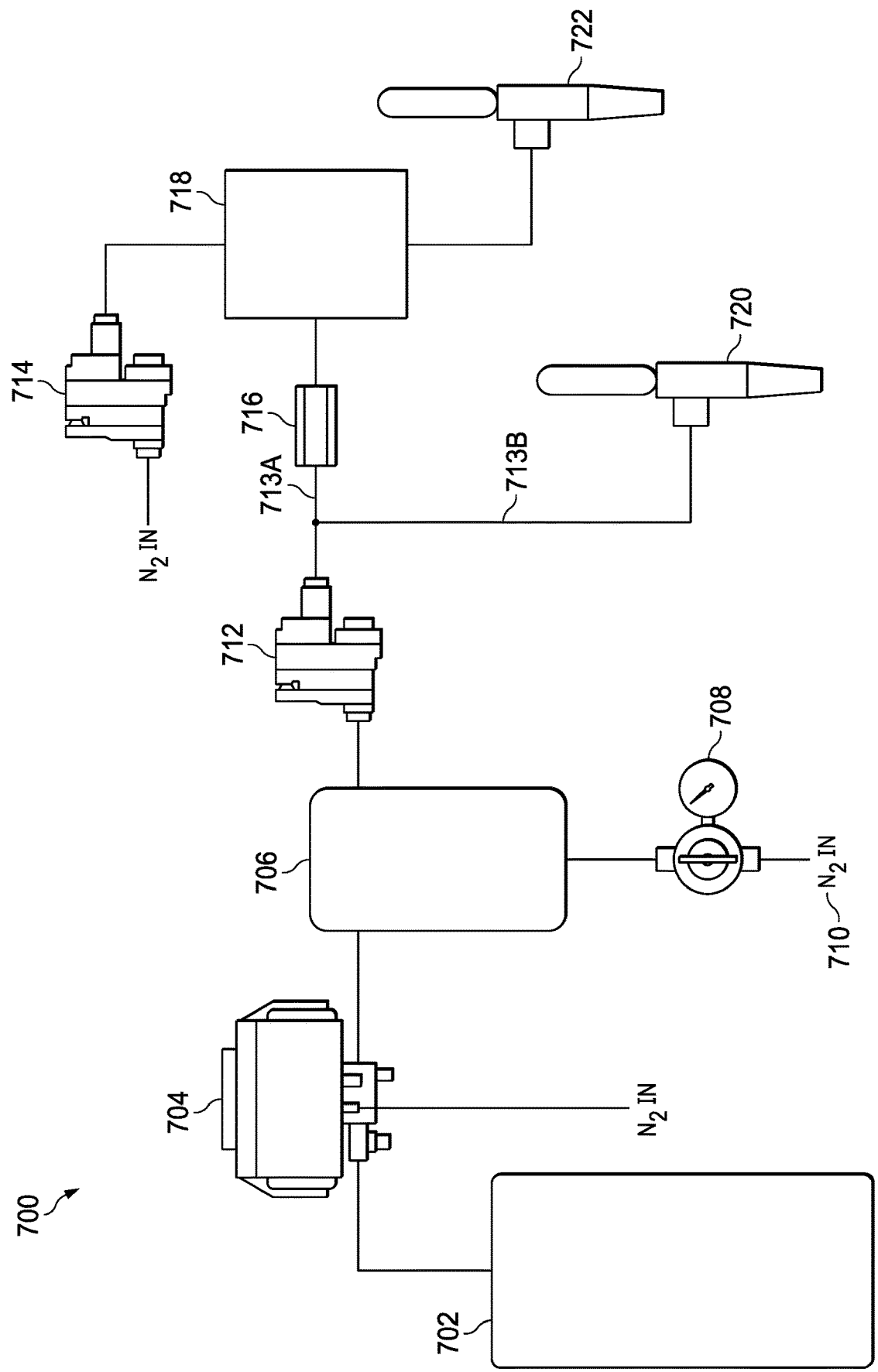
FIG. 7 is an illustration of a dispensing system, according to one embodiment.

In FIG. 7, an illustration of a dispensing system is shown, according to one embodiment. A dispensing system 700 may include a product supply device 702 (e.g., Keg, bag-in-box, syrup line, etc.), a pump 704 (e.g., pneumatic, electric, etc.), an accumulator 706, a regulator 708, a plugged CFValve with a first spring 712 (and/or a CFValve), a check valve 716, an infusing unit 718 (and/or infuser/sparger—Glad type, Sparger, Infuser, etc.), a plugged CFValve with a second spring 714, a first outlet 720 (e.g., still out area), and/or a second outlet 722 (a nitro out area). In this example, the product is coffee. However, the product could be beer, juice, water, soda, etc. Further, the product is at a pressure of less than 10 PSI. Therefore, any pressure from 0.01 PSI to approximately 10 PSI can be utilized. Therefore, all numbers in this range and disclosed in this document (and/or equivalents) are included but not listed for brevity. For example, 0.01 PSI, 0.02 PSI, . . . , 9.999999999999 PSI. Further, all ranges in this range are also disclosed in this document (and/or equivalents) are included but not listed for brevity. For example, 9.1 PSI to 9.3 PSI, 5.01 PSI to 5.02 PSI, etc. In one example, the coffee product travels via a clear beverage hose (e.g., 68"-⅜, and/or any other size) to the pump 704 and is mixed with N2. This mixture travels via a ¼" Braid (52" length and/or any other length) to the accumulator 706. This mixture in the accumulator 706 is regulated via the regulator 708 where the regulator 708 utilizes a N2 source 710 (and/or compressed air, CO2, other gases, other mixed gases, etc.) to regulate the mixture. In this example, the regulator 708 is at a pressure of 60 PSI. However, any pressure can be utilized from 0.1 PSI to 200 PSI (all other pressures disclosed in this document and/or pressure ranges and/or equivalents are included in this document but not written for brevity). The mixture leaves the accumulator 706 via a ¼" Braid (8" length and/or any other length) and travels to the plugged CFValve with a first spring 712. The mixture leaves the plugged CFValve with a first spring 712 via a ¼" Braid (1.5" length and/or any other length) and travels either (713A or 713B) to the check valve 716 and/or the first outlet area 720. The mixture travels to the first outlet area 720 via a ¼ Braid (24" length and/or any other length) and 9" ⁵⁄₁₆ OD hard tubing. The mixture travels from the check valve 716 to the infusing unit 718 where the mixture is combined with N2 (and/or any other gas) via plugged CFValve with a second spring 714. The mixture then leaves the infusing unit 718 and travels to the second outlet area 722 via a ¼ Braid (24" length and/or any other length) and a 9" ⁵⁄₁₆ OD hard tubing. In one example, a first spring and a second spring may be at the same spring load tension (e.g., 43 PSI) and in another example the first spring and the second spring may be at two different spring load tensions (e.g., 29 PSI and 43 PSI and/or any other pressures disclosed in this document). Some of the many advantages of this system are that the same premixed product can be dispensed with and/or without gas from the same source (e.g., cold brew coffee and nitro coffee). In addition, this system uses no electricity because the same gas that is utilized for the infusing function (e.g., infusing gas into the eventually dispensed product) is used to power the pumping function and/or the CFValves (reference numbers 712 and 714) do not need a solenoid. The CFValves do not require a solenoid because the pressure is controlled at the faucet and the faucet is the on/off function. The additional benefit of this system is that the CFValves control the pressure to allow for the perfect flow rate and the perfect infusion of gas. The system may utilize fixed orifices to control flow rates and gas settings and required very little technical knowledge to utilize. Further, there is minimal cost to this system both to manufacture and to operate. In addition, it can be portable as to it is not plumbed to a water source or connected to an electricity source.

Figure 8:
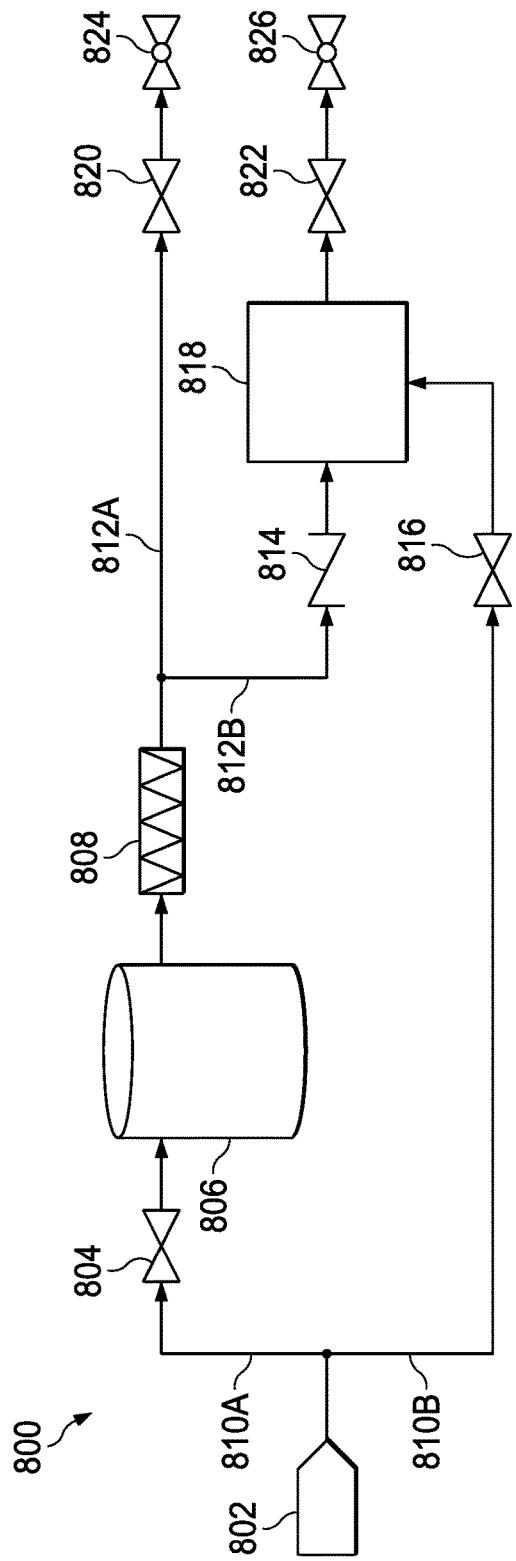
FIG. 8 is an illustration of a dispensing system, according to one embodiment.

In FIG. 8, an illustration of a dispensing system is shown, according to one embodiment. A dispensing system 800 may include a gas source 802, a first CFValve 804, a storage device 806 (e.g., KEG-Mixed coffee cold brew at 1.1 ratio and/or any other product (beer, soda, water, etc.) at any other ratio 1.1 to 1, 1.2 to 1, . . . , 5 to 1, . . . , 100 to 1, etc.), a filter 808, a first valve 820 (and/or a needle valve, a fixed orifice, a variable orifice, etc.), a first dispensing device 824, a check valve 814, an infuser 818, a second valve 822 (and/or a needle valve, a fixed orifice, a variable orifice, etc.), a second dispensing device 826, and/or a second CFValve 816. The gas source 802 in this example is N2 at 50 PSI. However, the gas source 802 may be any gas (e.g., compressed air, CO2, mixed gases, etc.) at any pressure 1 PSI to 200 PSI (all other pressures disclosed in this document and/or pressure ranges and/or equivalents are included in this document but not written for brevity). All other pressures disclosed in this document and/or pressure ranges include at least 25 PSI, 26 PSI, 27 PSI, 28 PSI, 29 PSI, 30 PSI, 31 PSI, 32 PSI, 33 PSI, 34 PSI, 35 PSI, 36 PSI, 37 PSI, 38 PSI, 39 PSI, 40 PSI, 41 PSI, 42 PSI, 43 PSI, 44 PSI, 45 PSI, 46 PSI, 47 PSI, 48 PSI, 49 PSI, 50 PSI, 51 PSI, 52 PSI, 53 PSI, 54 PSI, 55 PSI, 56 PSI, 57 PSI, 58 PSI, 59 PSI, 60 PSI, 61 PSI, 62 PSI, 63 PSI, 64 PSI, 65 PSI, 66 PSI, 67 PSI, 68 PSI, 69 PSI, 70 PSI, 71 PSI, 72 PSI, 73 PSI, 74 PSI, 75 PSI, 76 PSI, 77 PSI, 78 PSI, 79 PSI, 80 PSI, 81 PSI, 82 PSI, 83 PSI, 84 PSI, 85 PSI, 86 PSI, 87 PSI, 88 PSI, 89 PSI, 90 PSI, 91 PSI, 92 PSI, 93 PSI, 94 PSI, 95 PSI, 96 PSI, 97 PSI, 98 PSI, 99 PSI, 100 PSI, 101 PSI, 102 PSI, 103 PSI, and/or 104 PSI. In addition, the pressure ranges include at least 5-10 PSI, 10-18 PSI, 18-25 PSI, 25-35 PSI, 35-45 PSI, 45-55 PSI, 55-65 PSI, 65-80 PSI, 80-90 PSI, 90-100 PSI, and/or 100-104 PSI.

In this example, the gas source 802 is utilized as a pressure source (and/or pushing source and/or a gas source for the mixture itself see the infuser 818) which travels through the first CFValve 804 (at 30 PSI and/or any other pressure from 1 PSI to 100 PSI) to the storage device 806 to move the mixed coffee brew (e.g., product-could be cold) to the filter 808. After the mixture is filtered by the filter 808, the filtered product travels either (812A or 812B) to the first valve 820 or the check valve 814. When the filtered mixture moves via a first path 812A to the first valve 820, the filtered mixture is dispensed via the first dispensing device 824. This filtered mixture has no material gas in this fluid stream. This filtered mixture from the first dispensing device 824 may have a flow rate of approximately 1 ounce/second (or 1.5 ounces per second, or 2 ounces per second, or 2.5 ounces per second, or 3 ounces per second, and/or any other flow rate). Also, please note that no orifice is present between the first CFValve 804 and the storage device 806. When the filtered mixture moves via a second path 812B to the check valve 814, the filtered mixture goes through the infuser 818 and gas from the gas source 802 and the second CFValve 816 (at 33 PSI and/or any other pressure from 1 PSI to 100 PSI) is infused into the filtered mixture. In one example, an orifice and/or a needle valve is added between the second CFValve 816 and the infuser 818. In this example, the gas source 802 was utilized for both pushing the liquid function and adding the gas to the mixture function. It should be noted that the gas source could be utilized for only the pushing feature or only the adding feature (e.g., infuser). Further, the filtered mixture which leaves the infuser 818 travels to the second valve 822 and is dispensed via the second dispensing device 826. This filtered mixture from the second dispensing device 826 may have a flow rate of approximately 1 ounce/second (or 1.5 ounces per second, or 2 ounces per second, or 2.5 ounces per second, or 3 ounces per second, and/or any other flow rate disclosed in this document (and/or equivalents)). In addition, this filtered mixture has material gas in this fluid stream. In one example, there is no filter 808 because the drink does not require a filtering function prior to the infuser 818. This system's benefits include no required electricity and/or pumps, the system can dispense both non-gas and gas infused products from the same drink source, the system is portable, the system is easy to operate, the system is easy to install, and/or any combination thereof.

Figure 9:
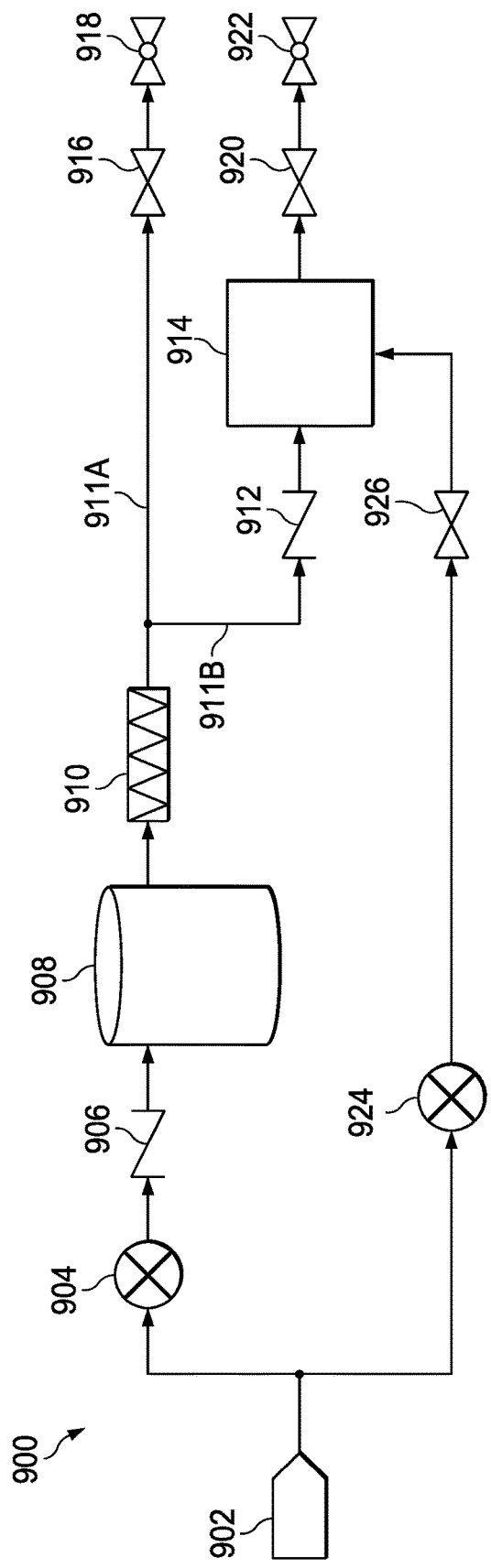
FIG. 9 is an illustration of a dispensing system, according to one embodiment.

In FIG. 9, an illustration of a dispensing system is shown, according to one embodiment. A dispensing system 900 may include a gas source 902, a first regulator 904, a first check valve 906, a storage device 908, a filter 910, a second check valve 912, an infuser 914, a first valve 916, a first outlet area 918, a second valve 920, a second outlet area 922, a second regulator 924, and/or a needle valve 926. Please note that one or more valves may be replaced with CFValves. The gas source 902 in this example is N2 at 55 PSI. However, the gas source 902 may be any gas (e.g., compressed air, CO2, mixed gases, etc.) at any pressure 1 PSI to 100 PSI (e.g., 40 PSI, 41 PSI, . . . , 50 PSI, . . . , 60 PSI). The storage device 908 may be a KEG with mixed coffee cold brew at 1.1 ratio and/or any other product (beer, soda, water, etc.) at any other ratio 2.1 to 1, 3 to 2, 4 to 3, 5 to 4, . . . , 100 to 3, etc.). The gas travels to either the first regulator 904 (at 30 PSI and/or any other pressure disclosed in this document (and/or equivalents)) or the second regulator 924 (at 40 PSI and/or any other pressure disclosed in this document (and/or equivalents)). After the gas travels through the first regulator 904, the gas pushes the product (in this example coffee but could be any product disclosed in this document (and/or equivalents)) out of the storage device 908 to the filter 910. The product leaves the filter 910 and either travels on a first path 911A to the first valve 916 and the first outlet area 918 or to a second path 911B. The product that is dispensed by the first outlet area 918 has a flow rate of 1 ounce/second (or 1.5 ounces per second, or 2 ounces per second, or 2.5 ounces per second, or 3 ounces per second, and/or any other flow rate disclosed in this document (and/or equivalents)) and is a product with no and/or minimal gas present in it. When the product travels on the second path 911B, the product enters the second check valve 912 (at a pressure of 28.9 PSI and/or any other pressure disclosed in this document (and/or equivalents)) and further travels to the infuser 914. In this example, the infuser 914 utilizes gas from the gas source 902 that has traveled through the second regulator 924 and the needle valve 926 to infuse the gas into the product. The infused product travels to the second valve 920 and exits via the second outlet area 922. The infused product has a flow rate of 1 ounce/second (or 1.5 ounces per second, or 2 ounces per second, or 2.5 ounces per second, or 3 ounces per second, and/or any other flow rate disclosed in this document (and/or equivalents)) and the infused product has gas present in it which was added by the infuser 914. In this example, the needle valve 926 has a pressure of 32.4 PSI (and/or any other pressure disclosed in this document (and/or equivalents)) and a flow rate of 0.16 SLPM (and/or any other flow rate).

Figure 10:
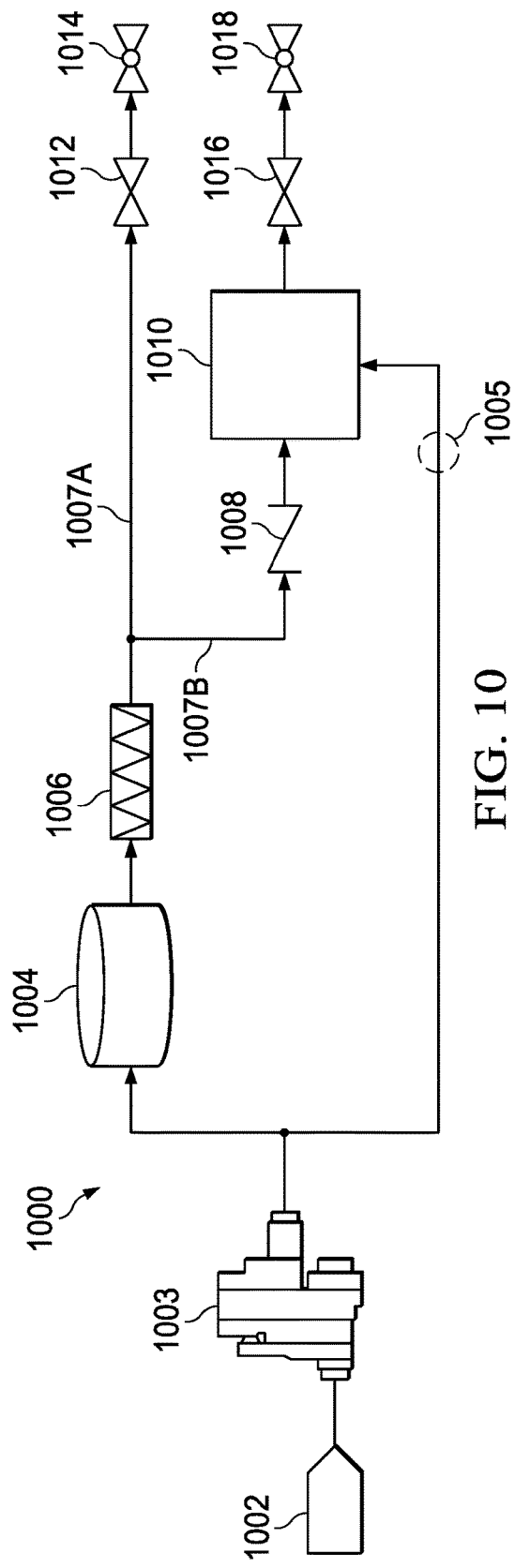
FIG. 10 is an illustration of a dispensing system, according to one embodiment.

In FIG. 10, an illustration of a dispensing system is shown, according to one embodiment. A dispensing system 1000 may include a gas source 1002, a CFValve 1003, a storage device 1004, a filter 1006, a check valve 1008, an infuser 1010, a first valve 1012 (and/or a needle valve, a fixed orifice, a variable orifice, etc.), a first outlet area 1014, a second valve 1016 (and/or a needle valve, a fixed orifice, a variable orifice, etc.), and/or a second outlet area 1018. Please note that one or more valves in this example may be replaced with CFValves. In addition, any valve disclosed in this document (and/or equivalents) may be replaced with a CFValve. The gas source 1002 in this example is N2 at 45 PSI. However, the gas source 902 may be any gas (e.g., compressed air, CO2, mixed gases, etc.) at any pressure 1 PSI to 100 PSI (e.g., 40 PSI, 41 PSI, ... , 50 PSI, ... , 60 PSI). In this example, the CFValve is at a pressure setting of 30 PSI (and/or any other pressure disclosed in this document (and/or equivalents)). The flow rate from the gas source 1002 to the infuser 1010 once the flow is past the CFValve 1003 is 0.16 SLPM (and/or any other flow rate). In this example, the CFValve 1003 regulates the pressure and/or flow rate for both the pushing function and the infusing with gas function. In this example, the gas from the gas source 1002 pushes the product out of the storage device 1004 through the filter 1006 and dispenses the product via the first valve 1012 and the first outlet area 1014. This dispensed product may be a gas infused product or a non-gas infused product. This product has a flow rate of approximately 1 ounce/second (or 1.5 ounces per second, or 2 ounces per second, or 2.5 ounces per second, or 3 ounces per second, and/or any other flow rate disclosed in this document (and/or equivalents)). Alternatively, the gas from the gas source 1002 goes to the infuser 1010 and is infused into the product from the storage device 1004 at the infuser location. This infused product is dispensed via the second valve 1016 and the second outlet area 1018. This product has gas infused into the product. This product has a flow rate of 1 ounce/second (or 1.5 ounces per second, or 2 ounces per second, or 2.5 ounces per second, or 3 ounces per second, and/or any other flow rate disclosed in this document (and/or equivalents)). In addition, optionally an orifice 1005 may be located before the infuser 1010 to control the gas volume entering the infuser 1005 (this could be a fixed or variable orifice or a needle valve).

Figure 11:
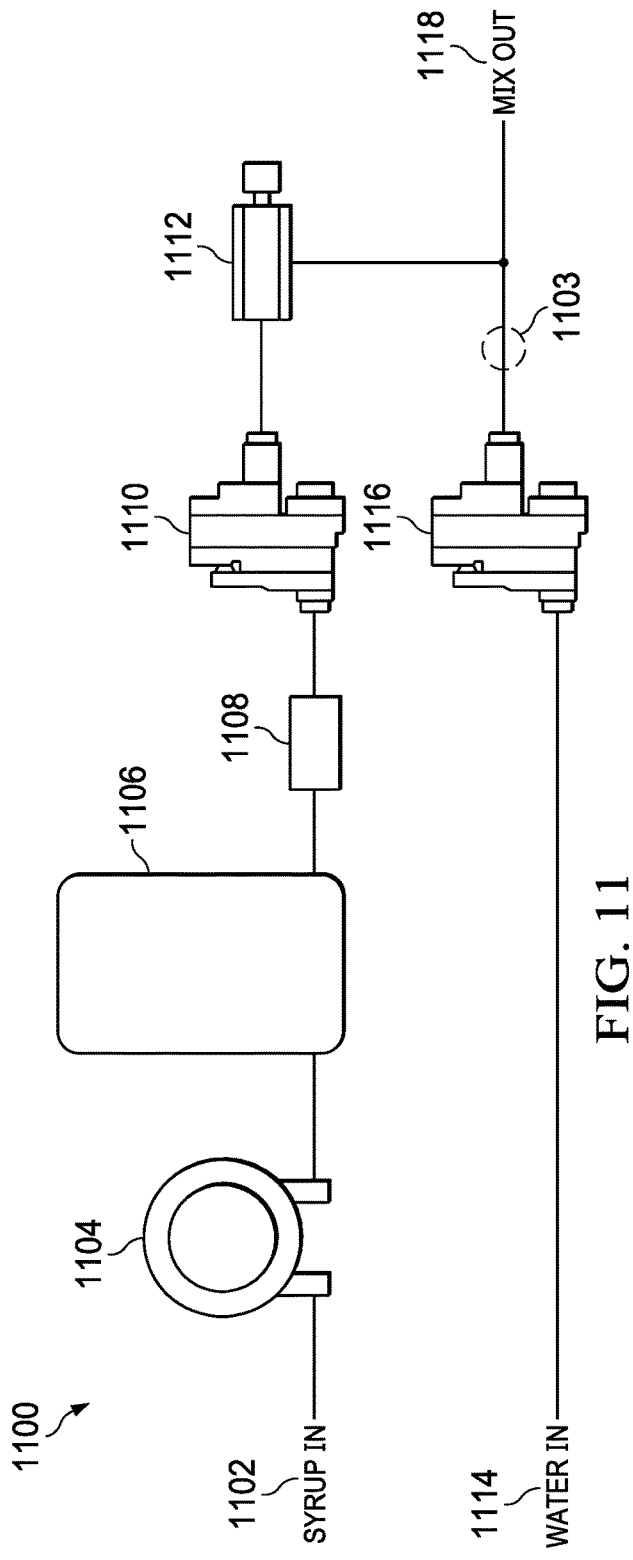
FIG. 11 is an illustration of a dispensing system, according to one embodiment.

In FIG. 11, an illustration of a dispensing system is shown, according to one embodiment. A dispensing system 1100 may include a syrup in source 1102, a water in source 1114 (and/or carbonated water source, etc.), a pump 1104 (e.g., peristaltic, electric, pneumatic, etc.), an accumulator 1106, a pressure switch 1108, a first CFValve 1110, a second CFValve 1116, a needle valve 1112, and a mix out area 1118. In this example, the first CFValve 1110 is at a pressure of 43 PSI (and/or any other pressure disclosed in this document (and/or equivalents)) and the second CFValve 1116 is at a pressure of 29 PSI (and/or any other pressure disclosed in this document (and/or equivalents)). In addition, the pump 1104 may include a speed controller. One of the benefits of this system is that any pump can be used for the syrup as the pressure switch will act to turn off the pump so that it can be a positive displacement pump. Further, the accumulator 1106 may act to dampen any surge from the pump. In addition, optionally an orifice 1103 may be located after the second CFValve 1116 (this could be a fixed or variable orifice or a needle valve).

Figure 12:
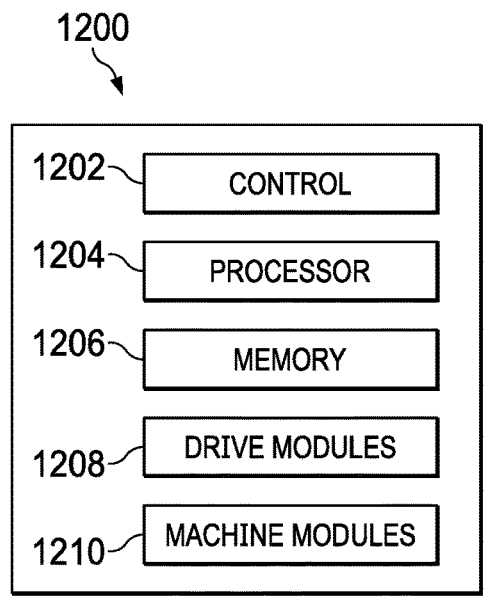
FIG. 12 is a block diagram, according to one embodiment.

In FIG. 12, a block diagram is shown, according to one embodiment. A device 1200 may include one or more controllers 1202, one or more processors 1204, one or more memory devices 1206, one or more drive modules 1208 and/or one or more machine modules 1210. The device 1200 may be utilized to control one or more functions of a dispensing system, a dispensing device, and/or a dispensing method.

Figure 13:
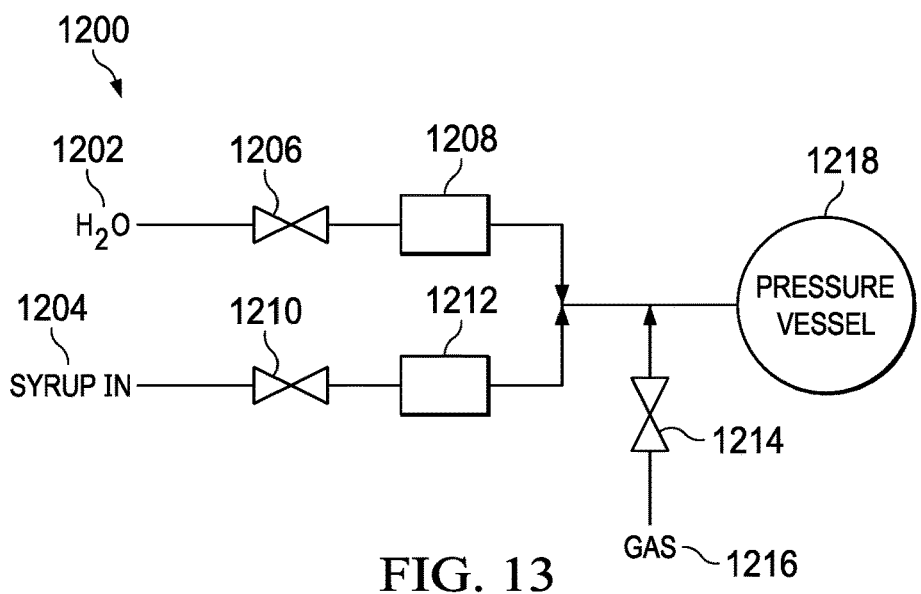
FIG. 13 is an illustration of a dispensing system, according to one embodiment.

In FIG. 13, an illustration of a dispensing system is shown, according to one embodiment. A dispensing system 1300 may include a water source 1302 (and/or any other liquid), a syrup source 1304, a first CFValve 1306, a second CFValve 1310, a first orifice 1308, a second orifice 1312, a third CFValve 1314, a gas source 1316 (e.g., N2, CO2, compressed air, mixed gases, etc.), and/or a pressure vessel 1318. The syrup source 1304 may be a liquid dispenser, a bag-in-box device, and/or any other syrup source disclosed in this document (and/or equivalents). In one example, the first CFValve 1306 controls the pressure and/or flow rate of the water, the second CFValve 1310 controls the pressure and/or flow rate of the syrup, and/or the third CFValve 1314 (and/or Nth CFValve) controls the pressure and/or flow rate of the gas. The gas in this example is Nitrogen but the gas could be carbon dioxide, compressed air, a mixture of gases, etc.

Figure 14:
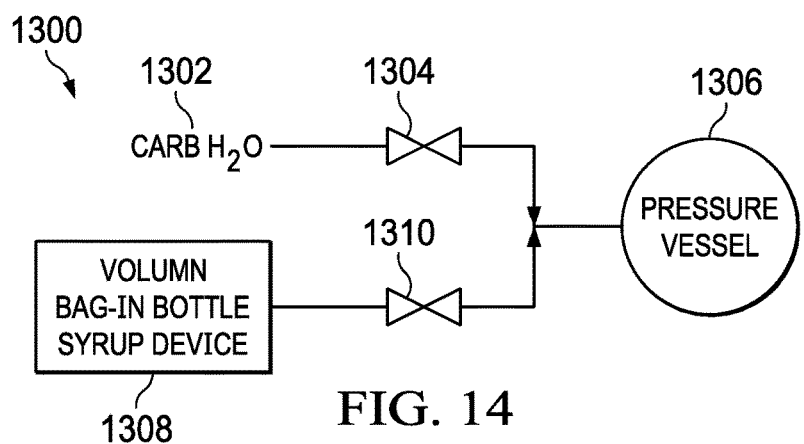
FIG. 14 is an illustration of a dispensing system, according to one embodiment.

In FIG. 14, an illustration of a dispensing system is shown, according to one embodiment. A dispensing system 1400 may include a liquid source 1402 (e.g., carbonated water, water, etc.), a syrup source 1408 (e.g., volume bag-in-box syrup device, etc.), a first CFValve 1404, a second CFValve 1410, and/or a pressure vessel 1406.

In one embodiment, a dispensing device may include a product unit including a pump to transmit one or more products to a sparger (and/or an infuser); a water source including one or more CFValves to transmit water to the sparger (and/or an infuser); a gas source to transmit one or more gases (any gas disclosed in this document and/or any equivalents thereof) to the sparger (and/or infuser); and/or a dispensing area for dispensing a mixture generated via the sparger (and/or infuser) from a product unit input, a water source input, and a gas source input. In one example, the product unit input and the water unit input travel to the infusing device via a common line (e.g., are mixed in the common line before entering the infusing device). In another example, the product unit input and the water unit input travel to the infusing device via two different lines (e.g., are not mixed before entering the infusing device).

In other examples, the product may be coffee, beer, soda, water, etc. In other examples, a flow rate of the mixture out of the dispensing may be 1.0 ounce per second, 1.5 ounces per second, 2.0 ounces per second, 2.5 ounces per second, 3.0 ounces per second, 3.5 ounces per second, 4.0 ounces per second, 4.5 ounces per second, 5.0 ounces per second, and/or any other flow rate. In other examples, the pump may be a volumetric pump, pneumatic pump, an electric pump, any other pump type, and/or any combination of pumps.

In another example, the CFValve is a regulating valve for maintaining a substantially constant flow of fluid from a variable pressure fluid supply to a fluid outlet, the CFValve including: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and/or g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet. Note that one or more of these elements and/or sub-elements for the CFValve may be modified and/or eliminated in the claims.

In another example, the one or more gases may include Nitrogen, Carbon Dioxide, compressed air, mixed gases, any other gas, and/or any combination of gases.

In another embodiment, a dispensing device may include a syrup unit including a CFValve to transmit one or more syrups to a mixing device; a water source to transmit water to the mixing device; a gas source to transmit one or more gases to the mixing device; and/or a dispensing area for dispensing a mixture generated via the mixing device from a syrup unit input, a water source input, and/or a gas source input.

In other examples, the product may be coffee, beer, soda, water, etc. In other examples, a flow rate of the mixture out of the dispensing may be 1.0 ounces per second, 1.5 ounces per second, 2.0 ounces per second, 2.5 ounces per second, 3.0 ounces per second, 3.5 ounces per second, 4.0 ounces per second, 4.5 ounces per second, 5.0 ounces per second, and/or any other flow rate. In another example, the water source and/or the gas source may further include a second CFValve.

In another example, the CFValve is a regulating valve for maintaining a substantially constant flow of fluid from a variable pressure fluid supply to a fluid outlet, the CFValve including: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

In another embodiment, a dispensing device may include a gas source including a CFValve to have a first gas stream and a second gas stream, the first gas stream may enter an infuser and the second gas stream may enter a product storage device, the second gas stream that enters the product storage device moves a product out of the product storage device to the infuser, the first gas stream enters the infuser and is infused into the product entering the infuser; and a dispensing area where the infused product from the infuser is dispensed.

In other examples, the product may be coffee, beer, soda, water, etc. In other examples, a flow rate of the infused product out of the dispensing may be 1.0 ounce per second, 1.5 ounces per second, 2.0 ounces per second, 2.5 ounces per second, 3.0 ounces per second, 3.5 ounces per second, 4.0 ounces per second, 4.5 ounces per second, 5.0 ounces per second, and/or any other flow rate. In another example, the product is coffee and the infused product is Nitro-coffee. In another example, the dispensing device further includes a cooling device to cool the infused product. In another example, a solenoid may be placed after any CFValve configuration disclosed in this document. In other examples, a filter may be added, a needle valve may be added, and/or any other element in this disclosure may be added to this embodiment.

All locations, sizes, shapes, measurements, ratios, amounts, angles, component or part locations, configurations, dimensions, values, materials, orientations, etc. discussed above or shown in the drawings are merely by way of example and are not considered limiting and other locations, sizes, shapes, measurements, ratios, amounts, angles, component or part locations, configurations, dimensions, values, materials, orientations, etc. can be chosen and used and all are considered within the scope of the disclosure.

Dimensions of certain parts as shown in the drawings may have been modified and/or exaggerated for the purpose of clarity of illustration and are not considered limiting.

While the valve has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples. Any combination of any element in this disclosure with any other element in this disclosure is hereby disclosed and only not listed for clarity and brevity.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. A dispensing device comprising:
   a product unit including a pressure source configured to transmit one or more products to an infusing device;
   a water source including one or more CFValves, a solenoid, and a check valve configured to transmit water to the infusing device;
   a gas source configured to transmit one or more gases to the infusing device; and
   a dispensing area for dispensing a mixture generated via the infusing device from a product unit input, a water source input, and a gas source input.

2. The dispensing device of claim 1, wherein the one or more products is coffee.

3. The dispensing device of claim 1, wherein a flow rate of the mixture out of the dispensing area is 1.0 ounce per second.

4. The dispensing device of claim 1, wherein a flow rate of the mixture out of the dispensing area is 2.0 ounces per second.

5. The dispensing device of claim 1, wherein a flow rate of the mixture out of the dispensing area is 2.5 ounces per second.

6. The dispensing device of claim 1, wherein a flow rate of the mixture out of the dispensing area is 3.0 ounces per second.

7. The dispensing device of claim 1, wherein the pressure source is a volumetric pump.

8. The dispensing device of claim 1, wherein the CFValve is a regulating valve for maintaining a substantially constant flow of fluid from a variable pressure fluid supply to a fluid outlet, the CFValve including: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

9. The dispensing device of claim 1, wherein the one or more gases includes Nitrogen.

10. A dispensing device comprising:
a syrup unit including a CFValve, a solenoid, and a check valve configured to transmit one or more syrups to a mixing device;
a water source configured to transmit water to the mixing device;
a gas source configured to transmit one or more gases to the mixing device; and
a dispensing area for dispensing a mixture generated via the mixing device from a syrup unit input, a water source input, and a gas source input.

11. The dispensing device of claim 10, wherein a flow rate of the mixture out of the dispensing area is 0.5 ounces per second.

12. The dispensing device of claim 10, wherein a flow rate of the mixture out of the dispensing area is 1.0 ounces per second.

13. The dispensing device of claim 10, wherein a flow rate of the mixture out of the dispensing area is 1.5 ounces per second.

14. The dispensing device of claim 10, wherein a flow rate of the mixture out of the dispensing area is 2.0 ounces per second.

15. The dispensing device of claim 10, wherein at least one of the water source or the gas source further include a second CFValve.

16. The dispensing device of claim 10, wherein the CFValve is a regulating valve for maintaining a substantially constant flow of fluid from a variable pressure fluid supply to a fluid outlet, the CFValve including: a) a housing having axially aligned inlet and outlet ports adapted to be connected respectively to the variable fluid supply and the fluid outlet; b) a diaphragm chamber interposed between the inlet and the outlet ports, the inlet port being separated from the diaphragm chamber by a barrier wall, the barrier wall having a first passageway extending therethrough from an inner side facing the diaphragm chamber to an outer side facing the inlet port; c) a cup contained within the diaphragm chamber, the cup having a cylindrical side wall extending from a bottom wall facing the outlet port to a circular rim surrounding an open mouth facing the inner side of the barrier wall, the cylindrical side and bottom walls of the cup being spaced inwardly from adjacent interior surfaces of the housing to define a second passageway connecting the diaphragm chamber to the outlet port; d) a resilient disc-shaped diaphragm closing the open mouth of the cup, the diaphragm being axially supported by the circular rim and having a peripheral flange overlapping the cylindrical side wall; e) a piston assembly secured to the center of the diaphragm, the piston assembly having a cap on one side of the diaphragm facing the inner side of the barrier wall, and a base suspended from the opposite side of the diaphragm and projecting into the interior of the cup; f) a stem projecting from the cap through the first passageway in the barrier wall to terminate in a valve head, the valve head and the outer side of the barrier wall being configured to define a control orifice connecting the inlet port to the diaphragm chamber via the first passageway; and g) a spring device in the cup coacting with the base of the piston assembly for resiliently urging the diaphragm into a closed position against the inner side of the barrier wall to thereby prevent fluid flow from the inlet port via the first passageway into the diaphragm chamber, the spring device being responsive to fluid pressure above a predetermined level applied to the diaphragm via the inlet port and the first passageway by accommodating movement of the diaphragm away from the inner side of the barrier wall, with the valve head on the stem being moved to adjust the size of the control orifice, thereby maintaining a constant flow of fluid from the inlet port through the first and second passageways to the outlet port for delivery to the fluid outlet.

17. A dispensing device comprising:
a gas source including a CFValve, a solenoid, and a check valve configured to have a first gas stream and a second gas stream, the first gas stream enters an infuser and the second gas stream enters a product storage device, the second gas stream that enters the product storage device moves a product out of the product storage device to the infuser, the first gas stream enters the infuser and is infused into the product entering the infuser; and a dispensing area where the infused product from the infuser is dispensed.

18. The dispensing device of claim 17, wherein a flow rate of the infused product is from 1.0 ounce to 3.0 ounces per second.

19. The dispensing device of claim 17, wherein the product is coffee and the infused product is Nitro-coffee.

20. The dispensing device of claim 17, further including a cooling device configured to cool at least one of the product, the product storage device, the infuser, and the infused product.

\* \* \* \* \*